(12) United States Patent
Togashi et al.

(10) Patent No.: US 8,107,216 B2
(45) Date of Patent: Jan. 31, 2012

(54) MULTILAYER CAPACITOR

(75) Inventors: Masaaki Togashi, Tokyo (JP); Takeru Yoshida, Tokyo (JP)

(73) Assignee: TDK Corporation, Tokyo (JP)

( * ) Notice: Subject to any disclaimer, the term of this patent is extended or adjusted under 35 U.S.C. 154(b) by 384 days.

(21) Appl. No.: 12/501,027

(22) Filed: Jul. 10, 2009

(65) Prior Publication Data

US 2010/0039750 A1 Feb. 18, 2010

(30) Foreign Application Priority Data

Aug. 18, 2008 (JP) ................................. 2008-209810

(51) Int. Cl.
*H01G 4/228* (2006.01)
(52) U.S. Cl. ..................... 361/306.3; 361/303; 361/311; 361/313; 361/306.1; 361/321.2
(58) Field of Classification Search ............... 361/306.3, 361/301.2, 301.4, 303–305, 308.1, 309, 311–313, 361/306.1, 321.1, 321.2
See application file for complete search history.

(56) References Cited

U.S. PATENT DOCUMENTS

| | | | | |
|---|---|---|---|---|
| 6,331,930 B1 * | 12/2001 | Kuroda et al. | ............. | 361/306.3 |
| 6,519,134 B1 * | 2/2003 | Li et al. | ................ | 361/306.1 |
| 7,027,288 B2 * | 4/2006 | Shimizu et al. | ............... | 361/303 |
| 7,046,500 B2 * | 5/2006 | Lee et al. | ...................... | 361/303 |
| 7,310,217 B2 * | 12/2007 | Takashima et al. | ......... | 361/306.3 |
| 7,446,996 B2 * | 11/2008 | Togashi | ........................ | 361/303 |
| 7,688,567 B2 * | 3/2010 | Aoki | ........................... | 361/306.3 |

FOREIGN PATENT DOCUMENTS

JP   A-2006-59977   3/2006

* cited by examiner

*Primary Examiner* — Nguyen T Ha
(74) *Attorney, Agent, or Firm* — Oliff & Berridge PLC

(57) ABSTRACT

A multilayer capacitor comprises a capacitor element body constituted by a plurality of laminated dielectric layers; first and second signal terminal electrodes and a ground terminal electrode which are arranged on an outer surface of the capacitor element body; and a ground electrode, first and second signal electrodes, and an intermediate internal electrode which are arranged within the capacitor element body. The first signal electrode is connected to the first signal terminal electrode, while the second signal electrode is connected to the second signal terminal electrode. The ground electrode is connected to the ground terminal electrode and has a first region overlapping the first signal electrode in a first direction in which the plurality of dielectric layers are laminated and a second region overlapping the second signal electrode in the first direction. The intermediate internal electrode is arranged such as to be separated from the first and second signal terminal electrodes and the ground terminal electrode and positioned between the first signal electrode and the ground electrode and between the second signal electrode and the ground electrode. The intermediate internal electrode has a region overlapping the first region in the first direction and a region overlapping the second region in the first direction.

12 Claims, 12 Drawing Sheets

MULTILAYER CAPACITOR

BACKGROUND OF THE INVENTION

1. Field of the Invention

The present invention relates to a multilayer capacitor.

2. Related Background Art

A multilayer capacitor as a measure against noise in a two-line signal path is disclosed in Japanese Patent Application Laid-Open No. 2006-59977. The multilayer capacitor disclosed in Japanese Patent Application Laid-Open No. 2006-59977 comprises a first signal line terminal connected to a first signal line, a second signal line terminal connected to a second signal line, and first and second ground terminals connected to grounding pads, while a first capacitor is constructed between the first signal line terminal and first ground terminal, and a second capacitor is constructed between the second signal line terminal and second ground terminal.

SUMMARY OF THE INVENTION

Higher voltage resistance is required for the first capacitor constructed between the first signal line terminal and first ground terminal electrode and the second capacitor constructed between the second signal line terminal and second ground terminal. Therefore, it is an object of the present invention to provide a multilayer capacitor which can easily improve the voltage resistance.

The present invention is a multilayer capacitor comprising a capacitor element body constituted by a plurality of laminated dielectric layers; first and second signal terminal electrodes and a ground terminal electrode which are arranged on an outer surface of the capacitor element body; and a ground electrode, first and second signal electrodes, and an intermediate internal electrode which are arranged within the capacitor element body, the first signal electrode being connected to the first signal terminal electrode, the second signal electrode being connected to the second signal terminal electrode; wherein the ground electrode is connected to the ground terminal electrode and has a first region overlapping the first signal electrode in a first direction in which the plurality of dielectric layers are laminated and a second region overlapping the second signal electrode in the first direction; wherein the intermediate internal electrode is arranged such as to be separated from the first and second signal electrodes and the ground terminal electrode and positioned between the first signal electrode and the ground electrode and between the second signal electrode and the ground electrode; and wherein the intermediate internal electrode has a region overlapping the first region in the first direction and a region overlapping the second region in the first direction.

In the multilayer capacitor of the present invention, a capacitor is formed by the intermediate internal electrode and the first signal electrode connected to the first signal terminal electrode, a capacitor is formed between the intermediate internal electrode and the second signal electrode connected to the second signal terminal electrode, and a capacitor is formed between the intermediate internal electrode and the ground electrode connected to the ground terminal electrode. As a consequence, respective pairs of capacitors connected in series are formed between the first and second signal terminal electrodes, between the first signal terminal electrode and the ground terminal electrode, and between the second signal terminal electrode and the ground terminal electrode. This can improve the voltage resistance. Even when one of the two capacitors is broken and short-circuited, the other capacitor exists between the terminals, whereby the insulation between the terminals can be kept. Since the intermediate internal electrode is shared by a plurality of capacitors, two capacitors connected in series between the terminals can be formed by a simple structure, while the multilayer capacitor can be made smaller.

Preferably, the ground electrode has a first ground electrode including the first region and a second ground electrode including the second region, while the first and second ground electrodes are arranged separately from each other.

In this case, the intermediate internal electrode and the first signal electrode form a capacitor, the intermediate internal electrode and the second signal electrode form a capacitor, the intermediate internal electrode and the first ground electrode form a capacitor, and the intermediate internal electrode and the second ground electrode form a capacitor. As a consequence, respective pairs of capacitors connected in series are formed between the first and second signal terminal electrodes, between the first signal terminal electrode and the first ground terminal electrode, and between the second signal terminal electrode and the second ground terminal electrode. The two capacitors between the first signal terminal electrode and the ground terminal electrode are different from the two capacitors between the second signal terminal electrode and the ground terminal electrode. This can inhibit crosstalk from occurring between the set of two capacitors formed between the first signal terminal electrode and ground terminal electrode and the set of two capacitors formed between the second signal terminal electrode and ground terminal electrode.

Preferably, the first and second signal electrodes are arranged on respective layers different from each other.

In this case, the first and second signal electrodes can be arranged such as to be separated more from each other. This can further inhibit crosstalk from occurring between the set of two capacitors formed between the first signal terminal electrode and ground terminal electrode and the set of two capacitors formed between the second signal terminal electrode and ground terminal electrode.

Preferably, the first and second ground electrodes are arranged on respective layers different from each other.

In this case, the first and second ground electrodes can be arranged such as to be separated more from each other. This can further inhibit crosstalk from occurring between the set of two capacitors formed between the first signal terminal electrode and ground terminal electrode and the set of two capacitors formed between the second signal terminal electrode and ground terminal electrode.

Preferably, the first signal electrode and the second ground electrode are arranged on the same layer, while the second signal electrode and the first ground electrode are arranged on the same layer.

In this case, the first and second signal electrodes can be arranged on respective layers different from each other, and the first and second ground electrodes can be arranged on respective layers different from each other, whereby the number of laminated layers can further be restrained from increasing. This allows the multilayer capacitor to attain a lower profile and can further inhibit crosstalk from occurring between the set of two capacitors formed between the first signal terminal electrode and ground terminal electrode and the set of two capacitors formed between the second signal terminal electrode and ground terminal electrode.

Preferably, the ground terminal electrode includes first and second terminal electrodes; the first signal electrode has first and second electrode parts, the first and second electrode parts being arranged separately from each other and commonly connected to the first signal terminal electrode; the second signal electrode has third and fourth electrode parts, the third and fourth electrode parts being arranged separately from each other and commonly connected to the second signal terminal electrode; the first ground electrode has a fifth electrode part including a third region overlapping the first electrode part in the first direction and a sixth electrode part including a fourth region overlapping the second electrode part in the first direction, the fifth and sixth electrode parts being arranged separately from each other, the fifth electrode part being connected to the first ground terminal electrode, the sixth electrode part being connected to the second ground terminal electrode; the second ground electrode has a seventh electrode part including a fifth region overlapping the third electrode part in the first direction and an eighth electrode part including a sixth region overlapping the fourth electrode part in the first direction, the seventh and eighth electrode parts being arranged separately from each other, the seventh electrode part being connected to the first ground terminal electrode, the eighth electrode part being connected to the second ground terminal electrode; the intermediate internal electrode is arranged between the first and fifth electrode parts, between the second and sixth electrode parts, between the third and seventh electrode parts, and between the fourth and eighth electrode parts; and the intermediate internal electrode has a region overlapping the third to sixth regions in the first direction.

In this case, the intermediate internal electrode forms respective capacitors with the first to eighth electrode parts. As a consequence, respective pairs of capacitors connected in series are formed between the first signal terminal electrode and the first ground terminal electrode, between the first signal terminal electrode and the second ground terminal electrode, between the second signal terminal electrode and the first ground terminal electrode, and between the second signal terminal electrode and the second ground terminal electrode. This can improve the voltage resistance between the terminals. Even when one of the two capacitors is broken and short-circuited, the other capacitor exists between the terminals, whereby the insulation between the terminals can be kept. Since the fifth and sixth electrode parts are arranged separately from each other while the seventh and eighth electrode parts are arranged separately from each other, crosstalk can be inhibited from occurring between the capacitors formed by these electrode parts.

Preferably, the intermediate internal electrode has a ninth electrode part including a region overlapping the third and fifth regions in the first direction and a tenth electrode part including a region overlapping the fourth and sixth regions in the first direction, while the ninth and tenth electrode parts are arranged separately from each other.

In this case, the ninth electrode part does not oppose any of the second, fourth, sixth, and eighth electrode parts in the first direction. The tenth electrode part does not oppose any of the first, third, fifth, and seventh electrode parts in the first direction. This can inhibit crosstalk from occurring between any of capacitors formed by the contribution of the first, third, fifth, seventh, and ninth electrode parts and any of capacitors formed by the contribution of the second, fourth, sixth, eighth, and tenth electrode parts.

Preferably, a capacitor formed by the first electrode part, intermediate internal electrode, and fifth electrode part has a capacitance different from that of a capacitor formed by the second electrode part, intermediate internal electrode, and sixth electrode part.

In this case, the capacitance of the capacitor formed between the first signal terminal electrode and the first ground terminal electrode and the capacitance of the capacitor formed between the first signal terminal electrode and the second ground terminal electrode differ from each other. Hence, the capacitors connected in parallel between the first signal terminal electrode and the first and second ground terminal electrodes have respective capacitances different from each other. This can widen the bandwidth yielding low impedance.

Preferably, the first and second electrode parts have respective areas different from each other.

In this case, the capacitance of the capacitor formed by the first electrode part and intermediate internal electrode and the capacitance of the capacitor formed by the second electrode part and intermediate internal electrode can easily be made different from each other. Hence, the capacitance of the capacitor formed by the first electrode part, intermediate internal electrode, and fifth electrode part and the capacitance of the capacitor formed by the second electrode part, intermediate internal electrode, and sixth electrode part can easily be made different from each other.

Preferably, the fifth and sixth electrode parts have respective areas different from each other.

In this case, the capacitance of the capacitor formed by the fifth electrode part and intermediate internal electrode and the capacitance of the capacitor formed by the sixth electrode part and intermediate internal electrode can easily be made different from each other. Hence, the capacitance of the capacitor formed by the first electrode part, intermediate internal electrode, and fifth electrode part and the capacitance of the capacitor formed by the second electrode part, intermediate internal electrode, and sixth electrode part can easily be made different from each other.

Preferably, the intermediate internal electrode has a ninth electrode part including a region overlapping the third and fifth regions in the first direction and a tenth electrode part including a region overlapping the fourth and sixth regions in the first direction, the ninth and tenth electrode parts are arranged separately from each other, and the ninth and tenth electrode parts have respective areas different from each other.

In this case, the capacitance of the capacitor formed between the first, fifth, and ninth electrode parts and the capacitance of the capacitor formed between the second, sixth, and tenth electrode parts can easily be made different from each other. Hence, the capacitors connected in parallel between the first signal terminal electrode and the first and second ground terminal electrodes have respective capacitances different from each other. This can widen the bandwidth yielding low impedance.

Preferably, the capacitor element body is formed like a substantially rectangular parallelepiped and has first and second side faces opposing each other and extending transversely of the capacitor element body and third and fourth side faces opposing each other and extending longitudinally of the capacitor element body, the first signal terminal electrode is arranged on the first side face, the second signal terminal electrode is arranged on the second side face, the first ground terminal electrode is arranged on the third side face, and the second ground terminal electrode is arranged on the fourth side face.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained with reference to the accompanying drawings. In the explanation, the same constituents or those having the same functions will be referred to with the same signs while omitting their overlapping descriptions.

First Embodiment

Figure 1:
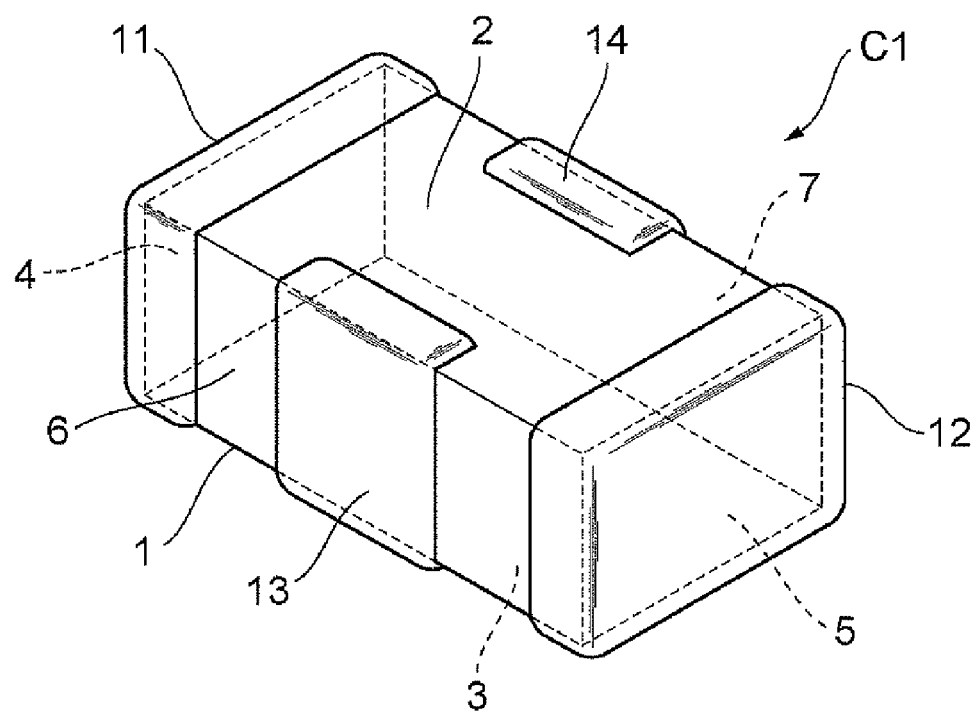
FIG. 1 is a perspective view of the multilayer capacitor in accordance with a first embodiment.
Figure 2:
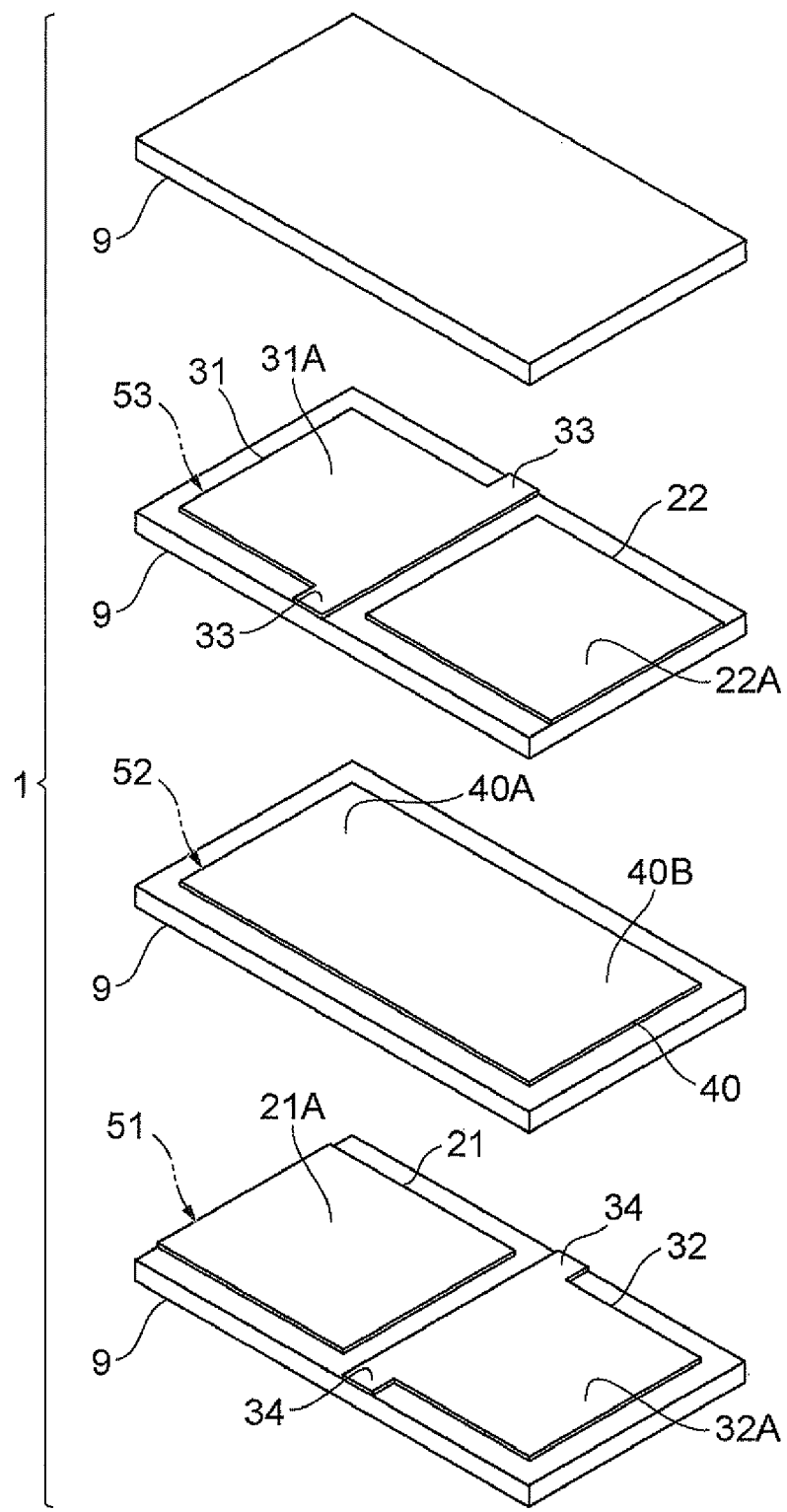
FIG. 2 is an exploded perspective view of a capacitor element body included in the multilayer capacitor in accordance with the first embodiment.
Figure 3:
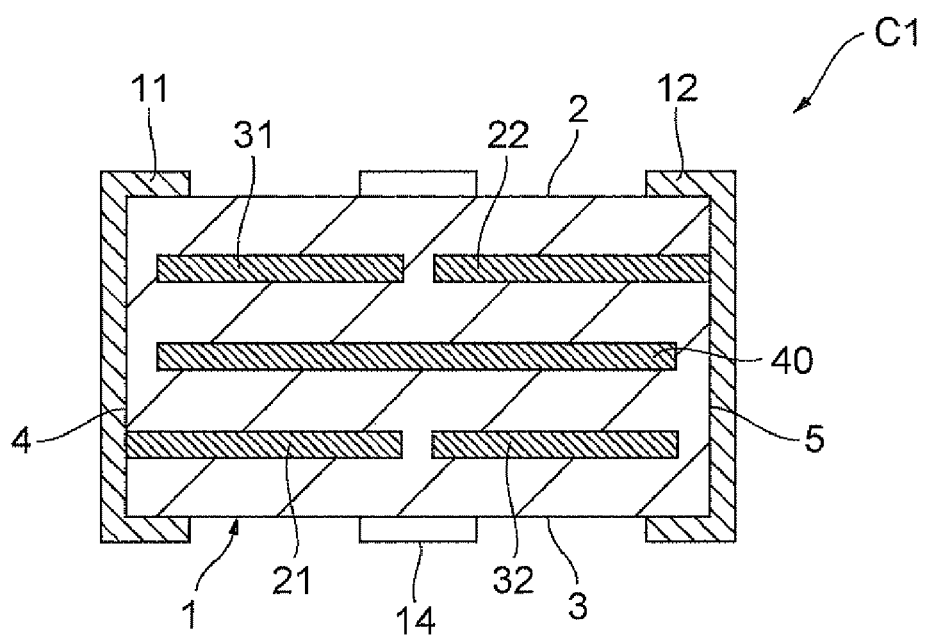
FIG. 3 is a view illustrating a cross-sectional structure of the multilayer capacitor in accordance with the first embodiment.
Figure 4:
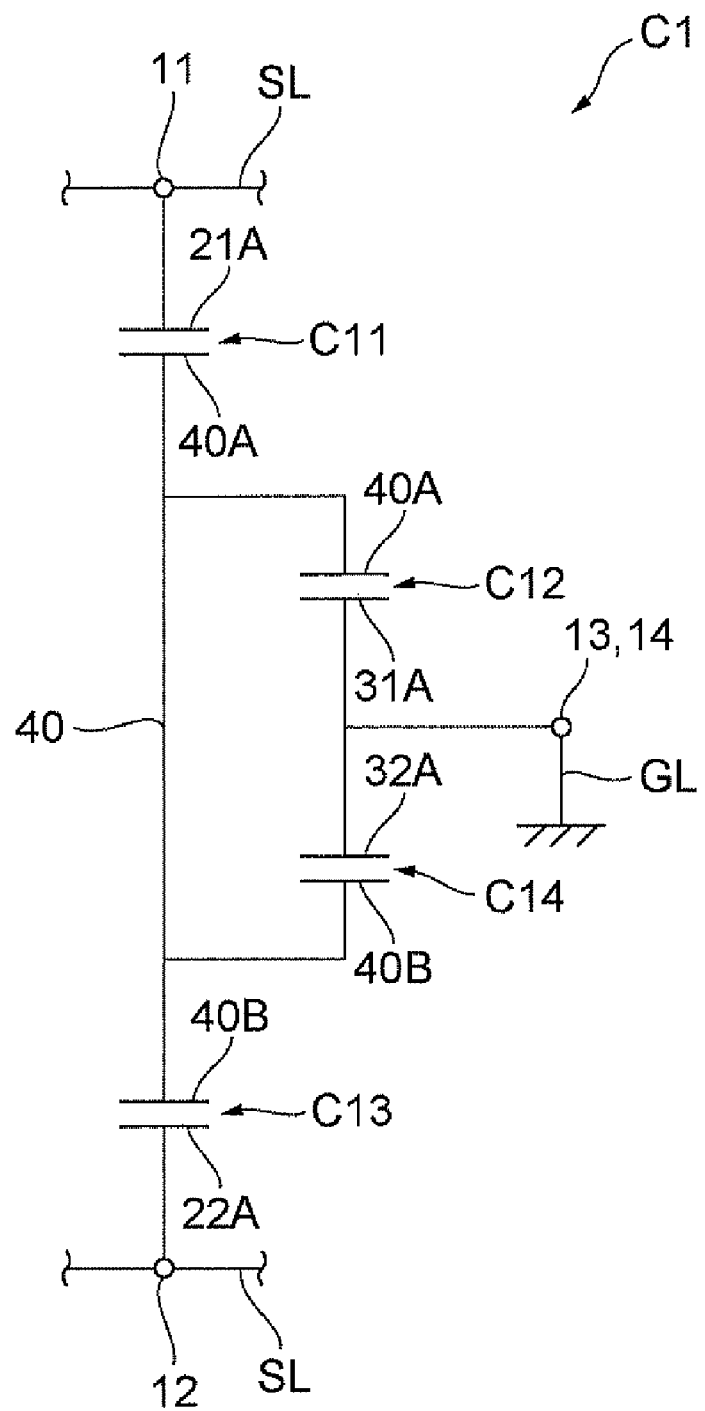
FIG. 4 is an equivalent circuit diagram of the multilayer capacitor in accordance with the first embodiment.

With reference to FIGS. 1 to 4, the structure of a multilayer capacitor C1 in accordance with the first embodiment will be explained. FIG. 1 is a perspective view of the multilayer capacitor in accordance with this embodiment. FIG. 2 is an exploded perspective view of a capacitor element body included in the multilayer capacitor in accordance with this embodiment. FIG. 3 is a view illustrating a cross-sectional structure of the multilayer capacitor in accordance with this embodiment. FIG. 4 is an equivalent circuit diagram of the multilayer capacitor in accordance with this embodiment.

As illustrated in FIG. 1, the multilayer capacitor C1 includes a capacitor element body 1 formed like a substantially rectangular parallelepiped. The capacitor element body 1 has rectangular first and second main faces 2, 3 opposing each other, first and second side faces 4, 5 opposing each other and extending transversely of the capacitor element body 1 (in the shorter side direction of the main faces 2, 3), and third and fourth side faces 6, 7 opposing each other and extending longitudinally of the capacitor element body 1 (in the longer side direction of the main faces 2, 3).

The multilayer capacitor C1 comprises a first signal terminal electrode 11, a second signal terminal electrode 12, a first ground terminal electrode 13, and a second ground terminal electrode 14 which are arranged separately from each other on outer surfaces of the capacitor element body 1.

The first signal terminal electrode 11 is arranged on the first side face 4 of the capacitor element body 1. The first signal terminal electrode 11 is formed such as to cover the whole first side face 4 and end portions (closer to the first side face 4) of the first and second main faces 2, 3 and third and fourth side faces 6, 7. The second signal terminal electrode 12 is arranged on the second side face 5 of the capacitor element body 1. The second signal terminal electrode 12 is formed such as to cover the whole second side face 5 and end portions (closer to the second side face 5) of the first and second main faces 2, 3 and third and fourth side faces 6, 7.

The first ground terminal electrode 13 is arranged on the third side face 6 of the capacitor element body 1. The first ground terminal electrode 13 is formed such as to cover substantially the center portion of the third side face 6 in the opposing direction of the first and second side faces 4, 5 and a portion of the first and second main faces 2, 3.

The second ground terminal electrode 14 is arranged on the fourth side face 7 of the capacitor element body 1. The second ground terminal electrode 14 is formed such as to cover substantially the center portion of the fourth side face 7 in the opposing direction of the first and second side faces 4, 5 and a portion of the first and second main faces 2, 3. The first and second ground terminal electrodes 13, 14 oppose each other in the opposing direction of the third and fourth side faces 6, 7.

The first and second signal terminal electrodes 11, 12 and the first and second ground terminal electrodes 13, 14 are formed by applying and sintering a conductive paste containing a conductive metal powder and glass frit onto their corresponding outer surfaces of the capacitor element body 1, for example. Plating layers may be formed on the sintered first and second signal terminal electrodes 11, 12 and first and second ground terminal electrodes 13, 14 when necessary.

As illustrated in FIG. 2, the capacitor element body 1 comprises a plurality of dielectric layers 9. The capacitor element body 1 is constructed by laminating a plurality of dielectric layers 9 in the opposing direction of the first and second main faces 2, 3. Hence, the direction in which the first and second main faces 2, 3 oppose each other is the laminating direction (first direction) of the plurality of dielectric layers 9. Each dielectric layer 9 is constituted by a sintered body of a ceramic green sheet containing a dielectric ceramic (based on $BaTiO_3$, $Ba(Ti, Zr)O_3$, $(Ba, Ca)TiO_3$, or the like), for example, and has a property as a dielectric. In the actual multilayer capacitor C1, the dielectric layers 9 are integrated to such an extent that their boundaries are indiscernible.

As illustrated in FIGS. 2 and 3, the multilayer capacitor C1 comprises first and second signal internal electrodes 21, 22, first and second grounding internal electrodes 31, 32, and an intermediate internal electrode 40. The first and second signal internal electrodes 21, 22, the first and second grounding internal electrodes 31, 32, and the intermediate internal electrode 40 are made of a conductive material (e.g, Ni which is a base metal) typically used for internal electrodes of multilayer electronic components. The first and second signal internal electrodes 21, 22, the first and second grounding internal electrodes 31, 32, and the intermediate internal electrode 40 are constituted by sintered bodies of a conductive paste containing the above-mentioned conductive material.

The first and second signal internal electrodes 21, 22, the first and second grounding internal electrodes 31, 32, and the intermediate internal electrode 40 are arranged parallel to and held between the dielectric layers 9 within the capacitor element body 1. The first signal internal electrode 21 and the second grounding internal electrode 32 are arranged separately from each other and arranged in a row on the same layer (first layer 51). The second signal internal electrode 22 and the first grounding internal electrode 31 are arranged separately from each other and arranged in a row on the same layer (third layer 53).

The intermediate internal electrode 40 is arranged on the second layer 52 between the first and third layers 51, 53. Respective dielectric layers 9 having about the same thickness are arranged between the first and second layers 51, 52 and between the second and third layers 52, 53.

The first signal internal electrode 21 is arranged closer to the first side face 4 on the first layer 51. The first signal internal electrode 21 is substantially formed like a rectangle, while one side defining the rectangular form is exposed at the first side face 4. Therefore, the first signal internal electrode 21 is connected physically and electrically to the first signal terminal electrode 11 covering the first side face 4. The first signal internal electrode 21 is arranged such that the remaining three sides defining the rectangular form are separated from the second, third, and fourth side faces 5, 6, 7.

The first grounding internal electrode 31 is arranged closer to the first side face 4 on the third layer 53. The first grounding internal electrode 31 is substantially formed like a rectangle. The first grounding internal electrode 31 is arranged such that one side facing the second side face 5 and defining the rectangular form is separated from the second side face 5, while the remaining three sides are separated from their corresponding first, third, and fourth side faces 4, 6, 7.

The first grounding internal electrode 31 has a pair of lead portions 33. One lead portion 33 is led from a portion closer to the second side face 5 in one side facing the third side face 6 to the third side face 6, so that an end portion thereof is exposed at the third side face 6. Since the first ground terminal electrode 13 is formed such as to cover the end portion of the lead portion 33 exposed at the third side face 6, the first grounding internal electrode 31 and the first ground terminal electrode 13 are connected physically and electrically to each other.

The other lead portion 33 is led from a portion closer to the second side face 5 in one side facing the fourth side face 7 to the fourth side face 7, so that an end portion thereof is exposed at the fourth side face 7. Since the second ground terminal electrode 14 is formed such as to cover the end portion of the lead portion 33 exposed at the fourth side face 7, the first grounding internal electrode 31 and the second ground terminal electrode 14 are connected physically and electrically to each other.

The first signal internal electrode 21 and the first grounding internal electrode 31 are arranged such that the side parallel to the second side face 5 among the four sides defining the first signal internal electrode 21 and the side parallel to the second side face 5 among the four sides defining the first grounding internal electrode 31 overlap as seen in the laminating direction. The first signal internal electrode 21 and the first grounding internal electrode 31 are also arranged such that the sides parallel to the third and fourth side faces 6, 7 overlap as seen in the laminating direction. Therefore, the first signal internal electrode 21 has a substantially rectangular region 21A overlapping the first grounding internal electrode 31 as seen in the laminating direction. The first grounding internal electrode 31 has a substantially rectangular region (first region) 31A overlapping the first signal internal electrode 21 as seen in the laminating direction.

The second signal internal electrode 22 is arranged closer to the second side face 5 on the third layer 53. The second signal internal electrode 22 has a substantially rectangular form, while one side defining the rectangular form is exposed at the second side face 5. Therefore, the second signal internal electrode 22 is connected physically and electrically to the second signal terminal electrode 12 covering the second side face 5. The second signal internal electrode 22 is arranged such that the remaining three sides defining the rectangular form are separated from the first, third, and fourth side faces 4, 6, 7. The second signal internal electrode 22 has about the same form and size as the first signal internal electrode 21.

The second grounding internal electrode 32 is arranged closer to the second side face 5 on the first layer 51. The second grounding internal electrode 32 is substantially formed like a rectangle. The second grounding internal electrode 32 is arranged such that one side facing the first side face 4 and defining the rectangular form is separated from the first side face 4, while the remaining three sides are separated from their corresponding second, third, and fourth side faces 5, 6, 7. The second grounding internal electrode 32 has about the same form and size as the first grounding internal electrode 31.

The second grounding internal electrode 32 has a pair of lead portions 34. One lead portion 34 is led from a portion closer to the first side face 4 in one side facing the third side face 6 to the third side face 6, so that an end portion thereof is exposed at the third side face 6. Since the first ground terminal electrode 13 is formed such as to cover the end portion of the lead portion 34 exposed at the third side face 6, the second grounding internal electrode 32 and the first ground terminal electrode 13 are connected physically and electrically to each other.

The other lead portion 34 is led from a portion closer to the first side face 4 in one side facing the fourth side face 7 to the fourth side face 7, so that an end portion thereof is exposed at the fourth side face 7. Since the second ground terminal electrode 14 is formed such as to cover the end portion of the lead portion 34 exposed at the fourth side face 7, the second grounding internal electrode 32 and the second ground terminal electrode 14 are connected physically and electrically to each other.

The second signal internal electrode 22 and the second grounding internal electrode 32 are arranged such that the side parallel to the first side face 4 among the four sides defining the second signal internal electrode 22 and the side parallel to the first side face 4 among the four sides defining the second grounding internal electrode 32 overlap as seen in the laminating direction. The second signal internal electrode 22 and the second grounding internal electrode 32 are also arranged such that the sides parallel to the third and fourth side faces 6, 7 overlap as seen in the laminating direction. Therefore, the second signal internal electrode 22 has a substantially rectangular region 22A overlapping the second grounding internal electrode 32 as seen in the laminating direction. The second grounding internal electrode 32 has a substantially rectangular region (second region) 32A overlapping the second signal internal electrode 22 as seen in the laminating direction.

The intermediate internal electrode 40 is substantially formed like a rectangle, while its four sides defining the rectangular form are arranged such as to be separated from and parallel to their corresponding side faces 4 to 7. The intermediate internal electrode 40 is arranged such that the three sides parallel to the side faces 4, 6, 7 overlap the three sides of the first grounding internal electrode 31 parallel to the side faces 4, 6, 7, respectively, as seen in the laminating direction. The intermediate internal electrode 40 is arranged such that the three sides parallel to the side faces 5, 6, 7 overlap the three sides of the second grounding internal electrode 32 parallel to the side faces 5, 6, 7, respectively, as seen in the laminating direction.

The intermediate internal electrode 40 has a region 40A overlapping the region 31A of the first grounding internal electrode 31 as seen in the laminating direction. Hence, the region 40A of the intermediate internal electrode 40, the region 31A of the first grounding internal electrode 31, and the region 21A of the first signal internal electrode 21 overlap as seen in the laminating direction, Consequently, the region 40A of the intermediate internal electrode 40 and the region 21A of the first signal internal electrode 21 oppose each other through the dielectric layer 9 in the laminating direction, thereby constructing a first capacitor C11. The region 40A of the intermediate internal electrode 40 and the region 31A of the first grounding internal electrode 31 oppose each other through the dielectric layer 9 in the laminating direction, thereby constructing a second capacitor C12.

The first and second capacitors C11, C12 are on a par with each other in terms of the areas and distances by which their constituent electrode layers oppose each other. Hence, the capacitance of the first capacitor C11 and the capacitance of the second capacitor C12 are on a par with each other.

The intermediate internal electrode 40 has a region 40B overlapping the region 32A of the second grounding internal electrode 32 as seen in the laminating direction. Hence, the region 40B of the intermediate internal electrode 40, the region 32A of the second grounding internal electrode 32, and the region 22A of the second signal internal electrode 22 overlap as seen in the laminating direction.

Consequently, the region 40B of the intermediate internal electrode 40 and the region 22A of the second signal internal electrode 22 oppose each other through the dielectric layer 9 in the laminating direction, thereby constructing a third capacitor C13. The region 40B of the intermediate internal electrode 40 and the region 32A of the second grounding internal electrode 32 oppose each other through the dielectric layer 9 in the laminating direction, thereby constructing a fourth capacitor C14.

The third and fourth capacitors C13, C14 are on a par with each other in terms of the areas and distances by which their constituent electrode layers oppose each other. Hence, the capacitance of the third capacitor C13 and the capacitance of the fourth capacitor C14 are on a par with each other.

In thus constructed multilayer capacitor C1, the first signal terminal electrode 11 and second signal terminal electrode 12 are insulated from each other, while the first and second signal terminal electrodes 11, 12 are insulated from the first and second ground terminal electrodes 13, 14.

In the multilayer capacitor C1, as illustrated in FIG. 4, the first and second capacitors C11, C12 are connected in series between the first signal terminal electrode 11 and the first and second ground terminal electrodes 13, 14. The third and fourth capacitors C13, C14 are connected in series between the second signal terminal electrode 12 and the first and second ground terminal electrodes 13, 14. The first and third capacitors C11, C13 are connected in series between the first and second signal terminal electrodes 11, 12.

The multilayer capacitor C1 is mounted such that the first or second main face 2, 3 opposes another component (e.g., a circuit substrate or electronic component). For example, the first and second signal terminal electrodes 11, 12 are respectively connected to two signal transmission lines SL constituting a differential transmission line or the like. The first and second ground terminal electrodes 13, 14 are connected to respective ground lines GL. As a consequence, the multilayer capacitor C1 by itself functions to remove noise from the two signal transmission lines SL.

In this embodiment, as explained in the foregoing, respective pairs of capacitors connected in series are formed between the first and second signal terminal electrodes 11, 12, between the first signal terminal electrode 11 and the first and second ground terminal electrodes 13, 14, and between the second signal terminal electrode 12 and the first and second ground terminal electrodes 13, 14. This can improve the voltage resistance between the terminals. Even when one of the two capacitors is broken and short-circuited, the other capacitor exists between the terminals, whereby the insulation between the terminals can be kept.

In this embodiment, the first signal internal electrode 21 contributing to forming the first capacitor C11 and the second signal internal electrode 22 contributing to forming the third capacitor C13 are arranged separately from each other. This can inhibit crosstalk from occurring between the first and third capacitors C11, C13. Since the first and second signal internal electrodes 21, 22 are arranged on respective layers different from each other, the distance between the first and second signal internal electrodes 21, 22 can be made greater. Therefore, crosstalk can further be restrained from occurring between the first and third capacitors C11, C13.

In this embodiment, the first grounding internal electrode 31 contributing to forming the second capacitor C12 and the second grounding internal electrode 32 contributing to forming the fourth capacitor C14 are arranged separately from each other. This can inhibit crosstalk from occurring between the second and fourth capacitors C12, C14. Since the first and second grounding internal electrodes 31, 32 are arranged on respective layers different from each other, the distance between the first and second grounding internal electrodes 31, 32 can be made greater. Therefore, crosstalk can further be restrained from occurring between the second and fourth capacitors C12, C14.

In this embodiment, the first signal internal electrode 21 and the second grounding internal electrode 32 are arranged on the same layer, while the second signal internal electrode 22 and the first grounding internal electrode 31 are arranged on the same layer. As a consequence, the first and second signal internal electrodes 21, 22 can be arranged on respective layers different from each other, while the first and second grounding internal electrodes 31, 32 can be arranged on respective layers different from each other. This can reduce the number of laminations of internal electrodes 21, 22, 31, 32 and dielectric layers 9 for achieving a desirable capacitance in the first to fourth capacitors C11 to C14 to be formed, whereby the multilayer capacitor C1 (capacitor element body 1) can attain a lower profile.

This embodiment forms the first to fourth capacitors C11 to C14 by arranging the first and second signal internal electrodes 21, 22 and the first and second grounding internal electrodes 31, 32 such that they oppose the intermediate internal electrode 40 through their corresponding dielectric layers 9. Hence, the first to fourth capacitors C11 to C14 are formed so as to share the intermediate internal electrode 40. This can make the multilayer capacitor C1 smaller.

The intermediate internal electrode 40 functions to connect the first and second capacitors C11, C12 in series, the first and third capacitors C11, C13 in series, and the third and fourth capacitors C13, C14 in series. This can make the multilayer capacitor C1 smaller.

In the following, other embodiments in accordance with the present invention will be explained. The multilayer capacitors in accordance with the following embodiments differ from the multilayer capacitor C1 in accordance with the first embodiment in terms of structures of signal internal electrodes, grounding internal electrodes, and intermediate internal electrodes. In the following, structures which are different from those of the multilayer capacitor C1 in accordance with the first embodiment will mainly be explained, while omitting the common structures.

Second Embodiment

Figure 5:
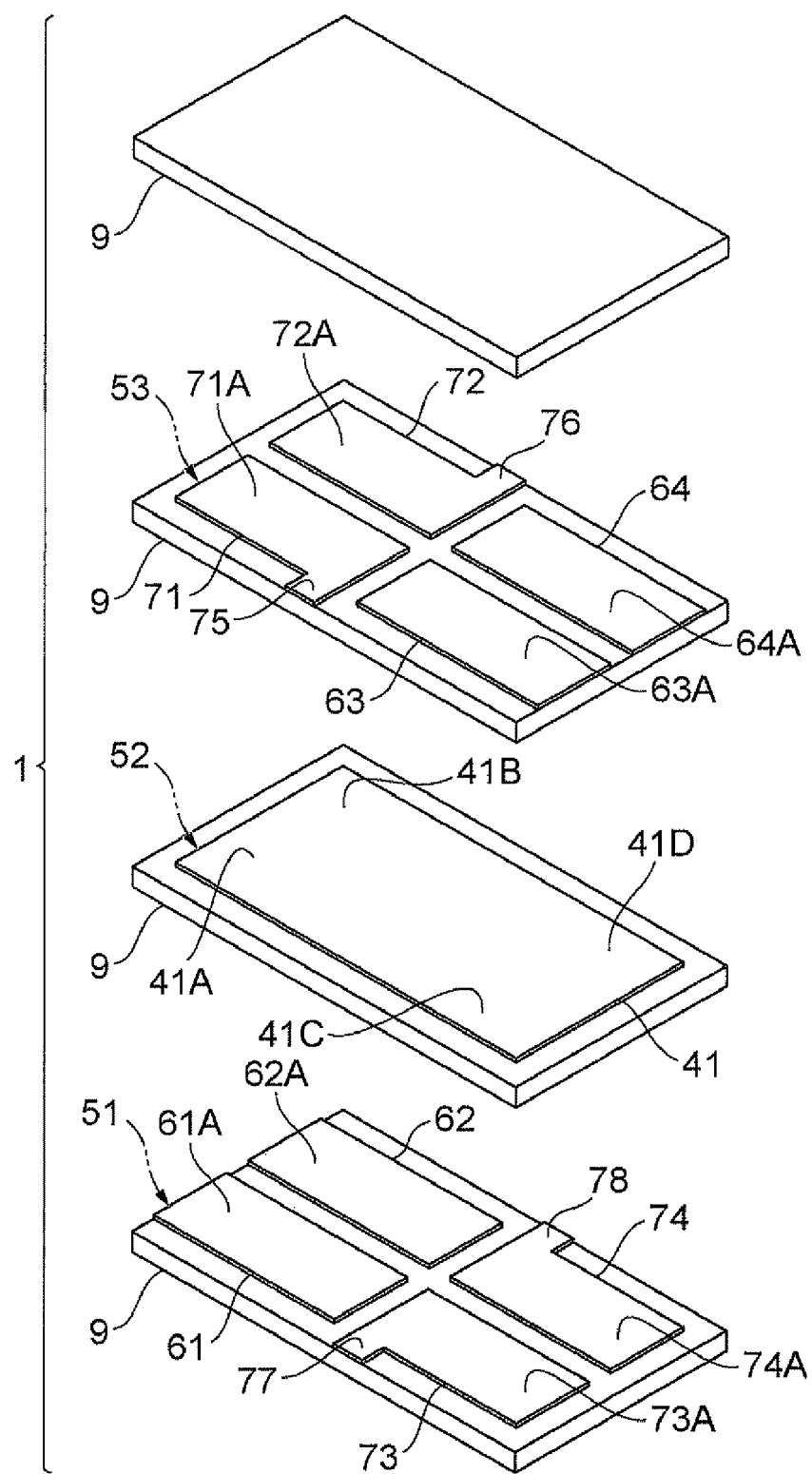
FIG. 5 is an exploded perspective view of a capacitor element body included in the multilayer capacitor in accordance with a second embodiment.
Figure 6:
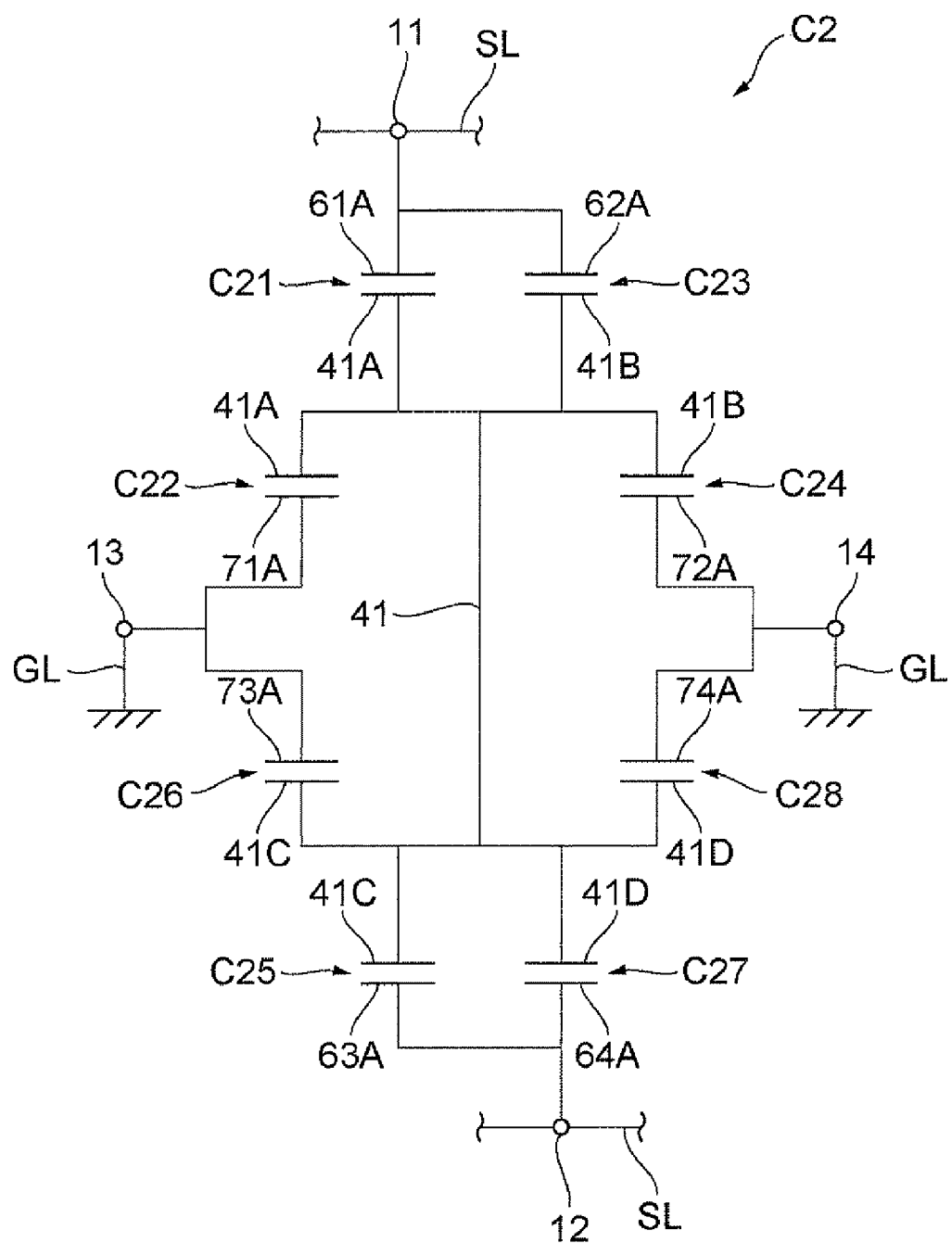
FIG. 6 is an equivalent circuit diagram of the multilayer capacitor in accordance with the second embodiment.

The structure of a multilayer capacitor C2 in accordance with the second embodiment will be explained with reference to FIGS. 5 and 6. FIG. 5 is an exploded perspective view of a capacitor element body included in the multilayer capacitor in accordance with this embodiment. FIG. 6 is an equivalent circuit diagram of the multilayer capacitor in accordance with this embodiment.

As illustrated in FIG. 5, the multilayer capacitor C2 in accordance with this embodiment comprises signal internal electrodes 61 to 64 instead of the above-mentioned first and second signal internal electrodes 21, 22. The multilayer capacitor C2 comprises grounding internal electrodes 71 to 74 instead of the above-mentioned first and second grounding internal electrodes 31, 32. The multilayer capacitor C2 comprises an intermediate internal electrode 41 instead of the above-mentioned intermediate internal electrode 40.

The first signal internal electrode has the signal internal electrodes (first and second electrode parts) 61, 62. The signal internal electrodes 61, 62 are formed as if the above-mentioned first signal internal electrode 21 were divided into two along a line parallel to the third side face 6 at a center portion in the opposing direction of the third and fourth side faces 6, 7. The signal internal electrodes 61, 62 are arranged separately from each other on the first layer 51. The signal internal electrodes 61, 62 have respective end portions exposed at the first side face 4, so as to be connected physically and electrically to the first signal terminal electrode 11 formed on the first side face 4.

The first grounding internal electrode has the grounding internal electrodes (fifth and sixth electrode parts) 71, 72. The grounding internal electrodes 71, 72 are formed as if the above-mentioned first grounding internal electrode 31 were divided into two along a line parallel to the third side face 6 at a center portion in the opposing direction of the third and fourth side faces 6, 7. The grounding internal electrodes 71, 72 are arranged separately from each other on the third layer 53.

The grounding internal electrode 71 has a lead portion 75. The lead portion 75 is led from a portion closer to the second side face 5 in one side facing the third side face 6 to the third side face 6, so that an end portion thereof is exposed at the third side face 6. As a consequence, the grounding internal electrode 71 is connected physically and electrically to the first ground terminal electrode 13 formed on the third side face 6.

The grounding internal electrode 72 has a lead portion 76. The lead portion 76 is led from a portion closer to the second side face 5 in one side facing the fourth side face 7 to the fourth side face 7, so that an end portion thereof is exposed at the fourth side face 7. As a consequence, the grounding internal electrode 72 is connected physically and electrically to the second ground terminal electrode 14 formed on the fourth side face 7.

The signal internal electrode 61 and the grounding internal electrode 71 are arranged such as to overlap as seen in the laminating direction. A region 61A in the signal internal electrode 61 and a region 71A in the grounding internal electrode 71 are regions overlapping each other as seen in the laminating direction. The signal internal electrode 62 and the grounding internal electrode 72 are arranged such as to overlap as seen in the laminating direction. A region 62A in the signal internal electrode 62 and a region 72A in the grounding internal electrode 72 are regions overlapping each other as seen in the laminating direction.

The second signal internal electrode has the signal internal electrodes (third and fourth electrode parts) 63, 64. The signal internal electrodes 63, 64 are formed as if the above-mentioned second signal internal electrode 22 were divided into two along a line parallel to the third side face 6 at a center portion in the opposing direction of the third and fourth side faces 6, 7. The signal internal electrodes 63, 64 are arranged separately from each other on the third layer 53. The signal internal electrodes 63, 64 have respective end portions exposed at the second side face 5, so as to be connected physically and electrically to the second signal terminal electrode 12 formed on the second side face 5.

The second grounding internal electrode has the grounding internal electrodes (seventh and eighth electrode parts) 73, 74. The grounding internal electrodes 73, 74 are formed as if the above-mentioned second grounding internal electrode 32 were divided into two along a line parallel to the third side face 6 at a center portion in the opposing direction of the third and fourth side faces 6, 7. The grounding internal electrodes 73, 74 are arranged separately from each other on the first layer 51.

The grounding internal electrode 73 has a lead portion 77. The lead portion 77 is led from a portion closer to the first side face 4 in one side facing the third side face 6 to the third side face 6, so that an end portion thereof is exposed at the third side face 6. As a consequence, the grounding internal electrode 73 is connected physically and electrically to the first ground terminal electrode 13 formed on the third side face 6.

The grounding internal electrode 74 has a lead portion 78. The lead portion 78 is led from a portion closer to the fourth side face 7 in one side facing the fourth side face 7 to the fourth side face 7, so that an end portion thereof is exposed at the fourth side face 7. As a consequence, the grounding internal electrode 74 is connected physically and electrically to the second ground terminal electrode 14 formed on the fourth side face 7.

The signal internal electrode 63 and the grounding internal electrode 73 are arranged such as to overlap as seen in the laminating direction. A region 63A in the signal internal electrode 63 and a region 73A in the grounding internal electrode 73 are regions overlapping each other as seen in the laminating direction. The signal internal electrode 64 and the grounding internal electrode 74 are arranged such as to overlap as seen in the laminating direction. A region 64A in the signal internal electrode 64 and a region 74A in the grounding internal electrode 74 are regions overlapping each other as seen in the laminating direction.

The intermediate internal electrode 41 is arranged as with the above-mentioned intermediate internal electrode 40 in terms of the form and position. The intermediate internal electrode 41 has a region 41A overlapping the region 61A of the signal internal electrode 61 and the region 71A of the grounding internal electrode 71 as seen in the laminating direction. Therefore, the region 41A of the intermediate internal electrode 41 and the region 61A of the signal internal electrode 61 oppose each other through the dielectric layer 9 in the laminating direction, thereby constructing a first capacitor C21. The region 41A of the intermediate internal electrode 41 and the region 71A of the grounding internal electrode 71 oppose each other through the dielectric layer 9 in the laminating direction, thereby constructing a second capacitor C22.

The intermediate internal electrode 41 has a region 41B overlapping the region 62A of the signal internal electrode 62 and the region 72A of the grounding internal electrode 72 as seen in the laminating direction. Therefore, the region 41B of the intermediate internal electrode 41 and the region 62A of the signal internal electrode 62 oppose each other through the dielectric layer 9 in the laminating direction, thereby constructing a third capacitor C23. The region 41B of the intermediate internal electrode 41 and the region 72A of the grounding internal electrode 72 oppose each other through the dielectric layer 9 in the laminating direction, thereby constructing a fourth capacitor C24.

The intermediate internal electrode 41 has a region 41C overlapping the region 63A of the signal internal electrode 63 and the region 73A of the grounding internal electrode 73 as seen in the laminating direction. Therefore, the region 41C of the intermediate internal electrode 41 and the region 63A of the signal internal electrode 63 oppose each other through the dielectric layer 9 in the laminating direction, thereby constructing a fifth capacitor C25. The region 41C of the intermediate internal electrode 41 and the region 73A of the grounding internal electrode 73 oppose each other through the dielectric layer 9 in the laminating direction, thereby constructing a sixth capacitor C26.

The intermediate internal electrode 41 has a region 41D overlapping the region 64A of the signal internal electrode 64 and the region 74A of the grounding internal electrode 74 as seen in the laminating direction. Therefore, the region 41D of the intermediate internal electrode 41 and the region 64A of the signal internal electrode 64 oppose each other through the dielectric layer 9 in the laminating direction, thereby constructing a seventh capacitor C27. The region 41 D of the intermediate internal electrode 41 and the region 74A of the grounding internal electrode 74 oppose each other through the dielectric layer 9 in the laminating direction, thereby constructing an eighth capacitor C28.

The first to eighth capacitors C21 to C28 are on a par with each other in terms of the areas and distances by which their constituent electrode layers oppose each other. Hence, the first to eighth capacitors C21 to C28 have about the same capacitance.

In thus constructed multilayer capacitor C2, the first signal internal electrode 11 and second signal internal electrode 12 are insulated from each other, while the first and second signal terminal electrodes 11, 12 are insulated from the first and second ground terminal electrodes 13, 14.

In the multilayer capacitor C2, as illustrated in FIG. 6, two capacitors, i.e., the first and second capacitors C21, C22, are connected in series between the first signal terminal electrode 11 and the first ground terminal electrode 13. Two capacitors, i.e., the third and fourth capacitors C23, C24, are connected in series between the first signal terminal electrode 11 and the second ground terminal electrode 14, Two capacitors, i.e., the fifth and sixth capacitors C25, C26, are connected in series between the second signal terminal electrode 12 and the first ground terminal electrode 13. Two capacitors, i.e., the seventh and eighth capacitors C27, C28, are connected in series between the second signal terminal electrode 12 and the second ground terminal electrode 14. As a consequence, the voltage resistance between the terminals can be improved. Even when one of the two capacitors is broken and short-circuited, the other capacitor exists between the terminals, whereby the insulation between the terminals can be kept.

In this embodiment, the signal internal electrode 61 and grounding internal electrode 71 contributing to forming the first and second capacitors C21, C22 do not overlap any of the signal internal electrodes 63, 64 and grounding internal electrodes 72 to 74 contributing to forming the third to eighth capacitors C23 to C28 in the laminating direction. This can inhibit crosstalk from occurring between the set of the first and second capacitors C21, C22 and the set of the third to eighth capacitors C23 to C28.

The signal internal electrode 62 and the grounding internal electrode 72 do not overlap any of the other signal internal electrodes and grounding internal electrodes in the laminating direction. The signal internal electrode 63 and the grounding internal electrode 73 do not overlap any of the other signal internal electrodes and grounding internal electrodes in the laminating direction. The signal internal electrode 64 and the grounding internal electrode 74 do not overlap any of the other signal internal electrodes and grounding internal electrodes in the laminating direction. Therefore, crosstalk can be suppressed, In this embodiment, the signal internal electrodes 61, 62 and the grounding internal electrodes 73, 74 are arranged on the same layer (first layer 51). The signal internal electrodes 63, 64 and the grounding internal electrodes 71, 72 are arranged on the same layer (third layer 53). The intermediate internal electrode 41 is arranged on a layer between the first and third layers 51, 53. As a consequence, the signal internal electrodes 61, 62 can be arranged on a layer different from that of the signal internal electrodes 63, 64, while the grounding internal electrodes 71, 72 can be arranged on a layer different from that of the grounding internal electrodes 73, 74. This can suppress crosstalk. Further, since the total number of laminations of signal internal electrodes, grounding internal electrodes, and intermediate internal electrodes for forming the first to eighth capacitors C21 to C28 and achieving a desirable capacitance can be reduced, the multilayer capacitor C2 (capacitor element body 2) can attain a lower profile.

In this embodiment, the signal internal electrodes 61, 62 and the grounding internal electrodes 73, 74 are arranged such as to oppose the intermediate internal electrode 41 through their corresponding dielectric layer 9. The signal internal electrodes 63, 64 and the grounding internal electrodes 71, 72 are arranged such as to oppose the intermediate internal electrode 41 through their corresponding dielectric layer 9. As a consequence, the first to eighth capacitors C21 to C28 are formed so as to share the intermediate internal electrode 41. This can make the multilayer capacitor C2 smaller.

The intermediate internal electrode 41 functions to connect the first and second capacitors C21, C22 in series, the third and fourth capacitors C23, C24 in series, the fifth and sixth capacitors C25, C26 in series, and the seventh and eighth capacitors C27, C28 in series. Therefore, the multilayer capacitor C2 can be made smaller.

Since the signal internal electrodes 61, 62 are arranged separately from each other, a surface of the dielectric layer 9 is exposed at the gap between the signal internal electrodes 61, 62 in this embodiment. The surface of the dielectric layer 9 exposed at the gap between the signal internal electrodes 61, 62 comes into close contact with the dielectric layer 9 adjacent thereto in the laminating direction. This can improve the bonding strength between the dielectric layers 9. Since the signal internal electrode 63 and the grounding internal electrodes 71, 73 are arranged separately from the signal internal electrode 64 and the grounding internal electrodes 72, 74, respectively, surfaces of dielectric layers 9 are exposed at the gaps between the electrode layers. The surfaces of the dielectric layers 9 exposed at the gaps between the electrode layers come into close contact with their adjacent dielectric layers 9. This can improve the bonding strength between the dielectric layers 9.

Third Embodiment

Figure 7:
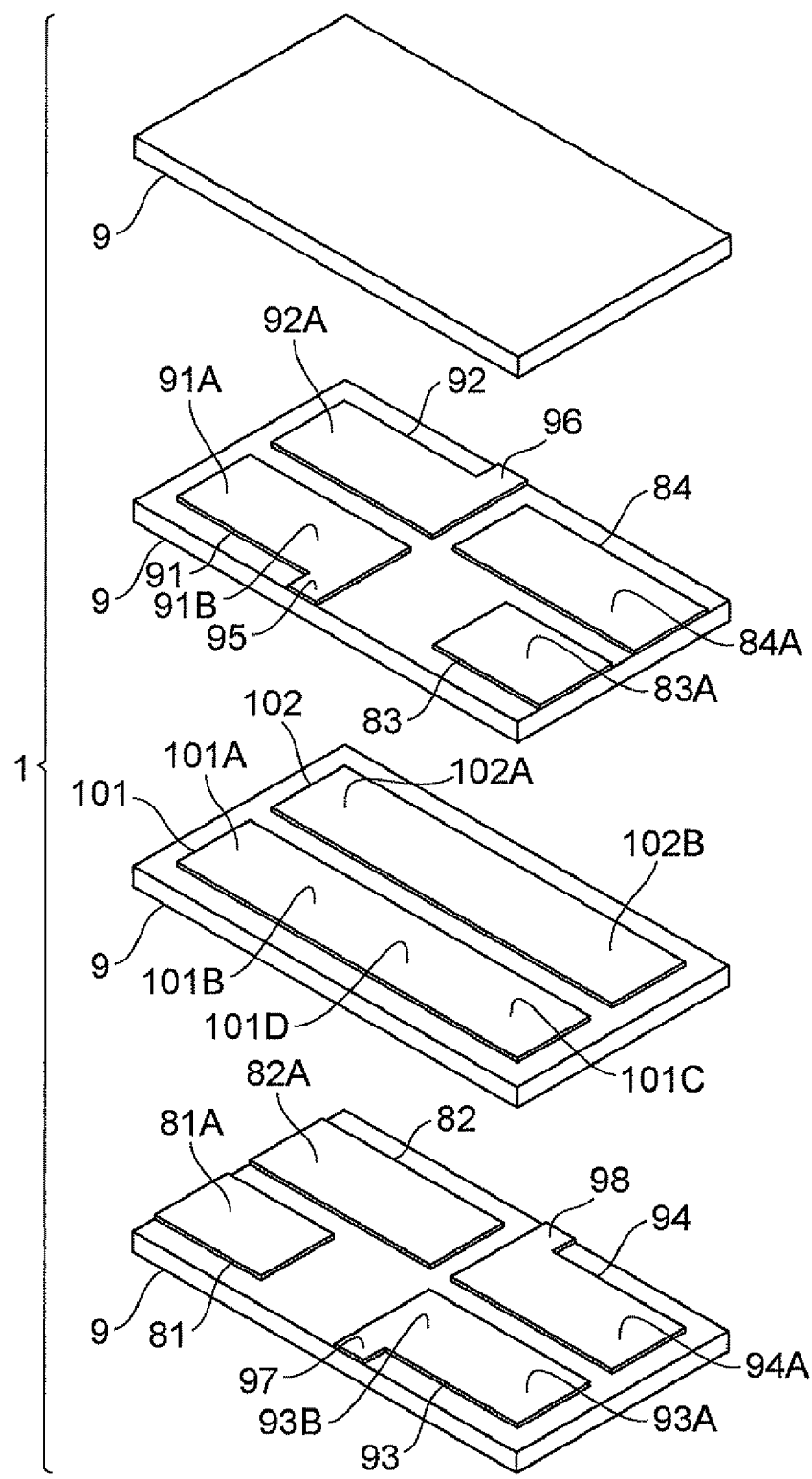
FIG. 7 is an exploded perspective view of a capacitor element body included in the multilayer capacitor in accordance with a third embodiment.
Figure 8A:
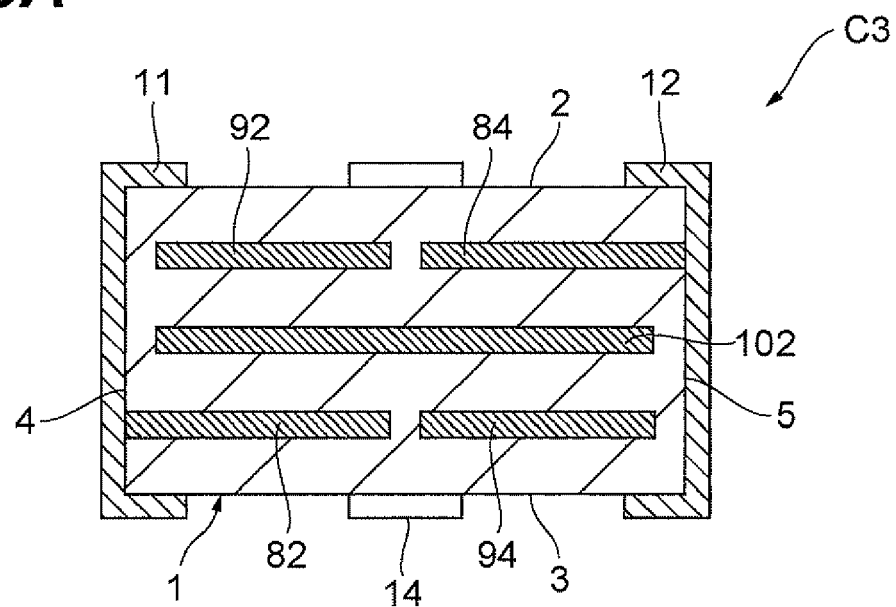
FIGS. 8A and 8B are views illustrating a cross-sectional structure of the multilayer capacitor in accordance with the third embodiment.
Figure 8B:
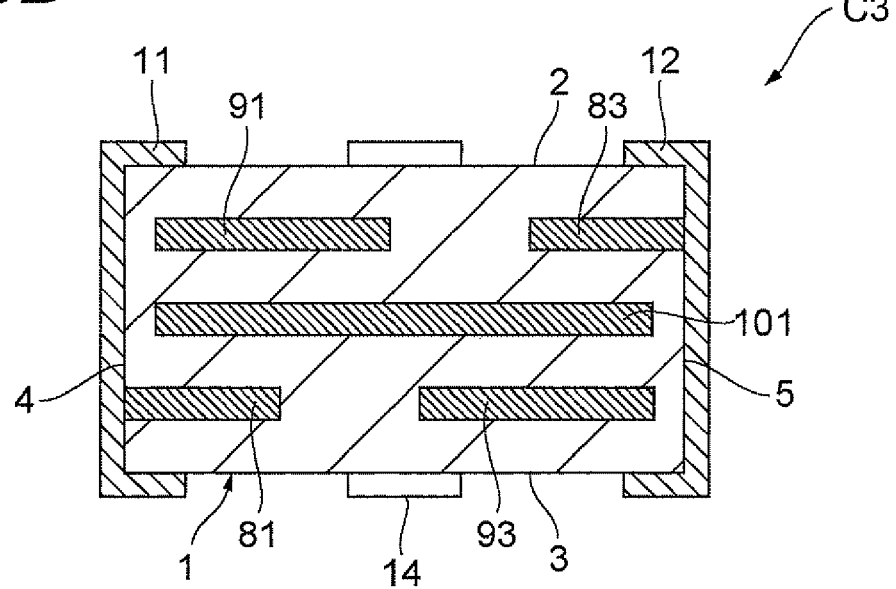
Figure 9:
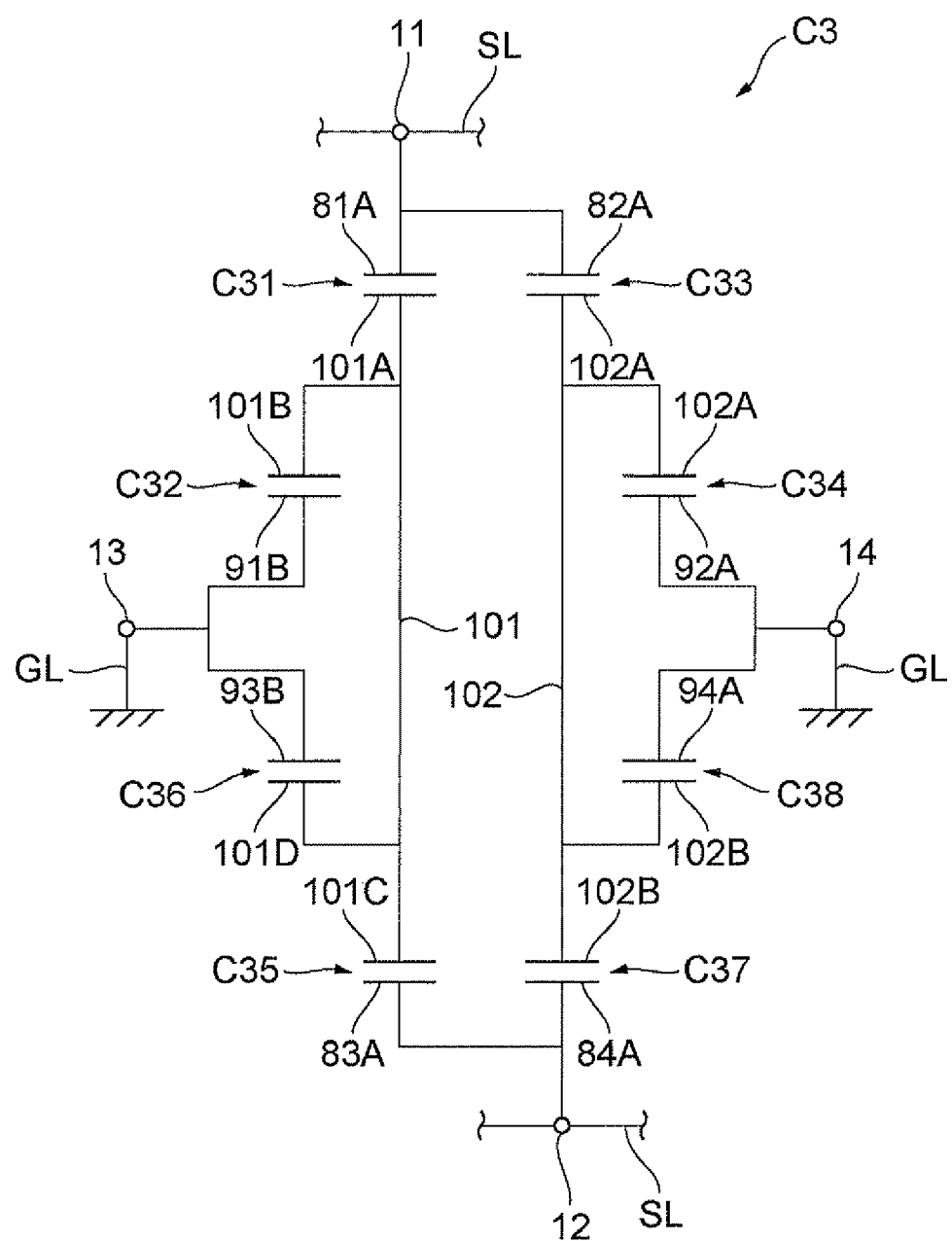
FIG. 9 is an equivalent circuit diagram of the multilayer capacitor in accordance with the third embodiment.

The structure of a multilayer capacitor C3 in accordance with the third embodiment will be explained with reference to FIGS. 7 to 9. FIG. 7 is an exploded perspective view of a capacitor element body included in the multilayer capacitor in accordance with this embodiment. FIGS. 8A and 8B are views illustrating a cross-sectional structure of the multilayer capacitor in accordance with this embodiment. FIG. 9 is an equivalent circuit diagram of the multilayer capacitor in accordance with this embodiment.

As illustrated in FIGS. 7, 8A, and 8B, the multilayer capacitor C3 in accordance with this embodiment comprises signal internal electrodes 81 to 84 instead of the signal internal electrodes 61 to 64 in accordance with the second embodiment. The multilayer capacitor C3 comprises grounding internal electrodes 91 to 94 instead of the grounding internal electrodes 71 to 74 in accordance with the second embodiment. The multilayer capacitor C3 comprises intermediate internal electrodes 101, 102 instead of the intermediate internal electrode 41 in accordance with the second embodiment. FIGS. 8A and 8B illustrate respective cross-sectional structures of the capacitor element body 1 cut along planes parallel to the third and fourth side faces 6, 7. FIG. 8A illustrates the structure in the case where the capacitor element body 1 is cut such that the cross section includes the internal electrodes 84, 92, while FIG. 8B illustrates the structure in the case where the capacitor element body 1 is cut such that the cross section includes the internal electrodes 83, 91.

The signal internal electrode 81 is shorter than the signal internal electrode 61 of the second embodiment in the opposing direction of the first and second side faces 4, 5. An end portion of the signal internal electrode 81 is exposed at the first side face 4 as in the signal internal electrode 61 of the second embodiment. Therefore, the signal internal electrode 81 and the first signal terminal electrode 11 are connected physically and electrically to each other.

The signal internal electrode 83 is shorter than the signal internal electrode 63 of the second embodiment in the opposing direction of the first and second side faces 4, 5. An end portion of the signal internal electrode 83 is exposed at the second side face 5 as in the signal internal electrode 63 of the second embodiment. Therefore, the signal internal electrode 83 and the second signal terminal electrode 12 are connected physically and electrically to each other.

The signal internal electrodes 82, 84 are arranged as with the signal internal electrodes 62, 64, respectively, in terms of their forms and positions. The signal internal electrodes 81, 83 have about the same area, which is smaller than that of any of the signal internal electrodes 82, 84.

The grounding internal electrodes 91 to 94 are arranged as with the grounding internal electrodes 71 to 74 of the second embodiment, respectively, in terms of their forms and positions. Therefore, the grounding internal electrodes 91, 93 are connected physically and electrically to the first ground terminal electrode 13, while the grounding internal electrodes 92, 94 are connected physically and electrically to the second ground terminal electrode 14.

The signal internal electrode 81 and the grounding internal electrode 91 are arranged such as to overlap as seen in the laminating direction. A region 81A in the signal internal electrode 81 and a region 91A in the grounding internal electrode 91 are regions opposing each other as seen in the laminating direction. The signal internal electrode 82 and the grounding internal electrode 92 are arranged such as to overlap as seen in the laminating direction. A region 82A in the signal internal electrode 82 and a region 92A in the grounding internal electrode 92 are regions opposing each other as seen in the laminating direction.

The signal internal electrode 83 and the grounding internal electrode 93 are arranged such as to overlap as seen in the laminating direction. A region 83A in the signal internal electrode 83 and a region 93A in the grounding internal electrode 93 are regions opposing each other as seen in the laminating direction. The signal internal electrode 84 and the grounding internal electrode 94 are arranged such as to overlap as seen in the laminating direction. A region 84A in the signal internal electrode 84 and a region 94A in the grounding internal electrode 94 are regions opposing each other as seen in the laminating direction.

The intermediate internal electrode has the intermediate internal electrodes (ninth and tenth electrode parts) 101, 102. The intermediate internal electrodes 101, 102 are formed as if the intermediate internal electrode 41 of the second embodiment were divided into two along a line parallel to the third side face 6 at a center portion in the opposing direction of the third and fourth side faces 6, 7. The intermediate internal electrodes 101, 102 are arranged separately from each other on the second layer 52.

The intermediate internal electrode 101 has a region 101A overlapping the region 81A of the signal internal electrode 81 and the region 91A of the grounding internal electrode 91 as seen in the laminating direction. Therefore, the region 101A of the intermediate internal electrode 101 and the region 81A of the signal internal electrode 81 oppose each other through the dielectric layer 9 in the laminating direction, thereby constructing a first capacitor C31.

The intermediate internal electrode 101 has a region 101B overlapping a region 91B of the grounding internal electrode 91 as seen in the laminating direction. Therefore, the region 101B of the intermediate internal electrode 101 and the region 91B of the grounding internal electrode 91 construct a second capacitor C32. The region 101B is one including the region 101A.

The intermediate internal electrode 102 has a region 102A overlapping the region 82A of the signal internal electrode 82 and the region 92A of the grounding internal electrode 92 as seen in the laminating direction. Therefore, the region 102A of the intermediate internal electrode 102 and the region 82A of the signal internal electrode 82 oppose each other through the dielectric layer 9 in the laminating direction, thereby constructing a third capacitor C33. The region 102A of the intermediate internal electrode 102 and the region 92A of the grounding internal electrode 92 oppose each other through the dielectric layer 9 in the laminating direction, thereby constructing a fourth capacitor C34.

The intermediate internal electrode 101 has a region 101C overlapping the region 83A of the signal internal electrode 83 and the region 93A of the grounding internal electrode 93 as seen in the laminating direction. Therefore, the region 101C of the intermediate internal electrode 101 and the region 83A of the signal internal electrode 83 oppose each other through the dielectric layer 9 in the laminating direction, thereby constructing a fifth capacitor C35.

The intermediate internal electrode 101 has a region 101D overlapping a region 93B of the grounding internal electrode 93 as seen in the laminating direction. Therefore, the region 101D of the intermediate internal electrode 101 and the region 93B of the grounding internal electrode 93 construct a sixth capacitor C36. The region 101D is one including the region 101C.

The intermediate internal electrode 102 has a region 102B overlapping the region 84A of the signal internal electrode 84 and the region 94A of the grounding internal electrode 94 as seen in the laminating direction. Therefore, the region 102B of the intermediate internal electrode 102 and the region 84A of the signal internal electrode 84 oppose each other through the dielectric layer 9 in the laminating direction, thereby constructing a seventh capacitor C37. The region 102B of the intermediate internal electrode 102 and the region 94A of the grounding internal electrode 94 oppose each other through the dielectric layer 9 in the laminating direction, thereby constructing an eighth capacitor C38.

In the multilayer capacitor C3, each of the areas by which the constituent electrode layers of the first and fifth capacitors C31, C35 oppose each other is smaller than any of the areas by which the constituent electrode layers of the second to fourth and sixth to eighth capacitors C32 to C34, C36 to C38 oppose each other. Hence, each of the first and fifth capacitors C31, C35 has a capacitance smaller than any of the second to fourth and sixth to eighth capacitors C32 to C34, C36 to C38.

In thus constructed multilayer capacitor C3, the first signal terminal electrode 11 and second signal terminal electrode 12 are insulated from each other, while the first and second signal terminal electrodes 11, 12 are insulated from the first and second ground terminal electrodes 13, 14.

In the multilayer capacitor C3, as illustrated in FIG. 9, two capacitors, i.e., the first and second capacitors C31, C32, are connected in series between the first signal terminal electrode 11 and the first ground terminal electrode 13. Two capacitors, i.e., the third and fourth capacitors C33, C34, are connected in series between the first signal terminal electrode 11 and the second ground terminal electrode 14. Two capacitors, i.e., the fifth and sixth capacitors C35, C36, are connected in series between the second signal terminal electrode 12 and the first ground terminal electrode 13. Two capacitors, i.e., the seventh and eighth capacitors C37, C38, are connected in series between the second signal terminal electrode 12 and the second ground terminal electrode 14. As a consequence, the voltage resistance between the terminals can be improved. Even when one of the two capacitors is broken and short-circuited, the other capacitor exists between the terminals, whereby the insulation between the terminals can be kept.

In this embodiment, the intermediate internal electrode 101 has no region overlapping any of the signal internal electrodes 82, 84 and grounding internal electrodes 92, 94. The intermediate internal electrode 102 has no region overlapping any of the signal internal electrodes 81, 83 and grounding internal electrodes 91, 93. Therefore, crosstalk can be inhibited from occurring between the first, second, fifth, and sixth capacitors C31, C32, C35, C36 constituted by the intermediate internal electrode 101, signal internal electrodes 81, 83, and grounding internal electrodes 91, 93 and the third, fourth, seventh, and eighth capacitors C33, C34, C37, C38 constituted by the intermediate internal electrode 102, signal internal electrodes 82, 84, and grounding internal electrodes 92, 94.

As illustrated in FIG. 9, a set of the first and second capacitors C31, C32 and a set of the third and fourth capacitors C33, C34 are connected in parallel between the first signal terminal electrode 11 and the first and second ground terminal electrodes 13, 14. The first capacitor C31 has a capacitance smaller than that of any of the second to fourth capacitors C32 to C34. Therefore, the capacitance by the first and second capacitors C31, C32 and the capacitance by the third and fourth capacitors C33, C34 differ from each other. Hence, the sets of capacitors connected in parallel between the first signal terminal electrode 11 and the first and second ground terminal electrodes 13, 14 exhibit respective capacitances different from each other. This can widen the bandwidth yielding low impedance.

A set of the fifth and sixth capacitors C35, C36 and a set of the seventh and eighth capacitors C37, C38 are connected in parallel between the second signal terminal electrode 12 and the first and second ground terminal electrodes 13, 14. The fifth capacitor C35 has a capacitance smaller than that of any of the sixth to eighth capacitors C36 to C38. Therefore, the capacitance by the fifth and sixth capacitors C35, C36 and the capacitance by the seventh and eighth capacitors C37, C38 differ from each other. Hence, the sets of capacitors connected in parallel between the first signal terminal electrode 11 and the first and second ground terminal electrodes 13, 14 exhibit respective capacitances different from each other. This can widen the bandwidth yielding low impedance.

In this embodiment, the area of the signal internal electrode 81 is set smaller than that of the signal internal electrode 82. This can easily make the capacitance of the capacitor formed by the signal internal electrode 81 and internal electrode 101 and the capacitance of the capacitor formed by the signal internal electrode 82 and internal electrode 102 differ from each other. Hence, the capacitance of the first capacitor C31 can easily be made different from that of any of the second to fourth capacitors C32 to C34.

In this embodiment, the area of the signal internal electrode 83 is set smaller than that of the signal internal electrode 84. This can easily make the capacitance of the capacitor formed by the signal internal electrode 83 and internal electrode 101 and the capacitance of the capacitor formed by the signal internal electrode 84 and internal electrode 102 differ from each other. Hence, the capacitance of the fifth capacitor C35 can easily be made different from that of any of the sixth to eighth capacitors C36 to C38.

Since the intermediate internal electrodes 101, 102 are arranged separately on the same layer, a surface of the dielectric layer 9 is exposed at the gap between the electrodes in this embodiment. The surface of the dielectric layer 9 exposed at the gap between the electrodes comes into close contact with the dielectric layer 9 adjacent thereto in the laminating direction. This can improve the bonding strength between the dielectric layers 9.

Fourth Embodiment

Figure 10:
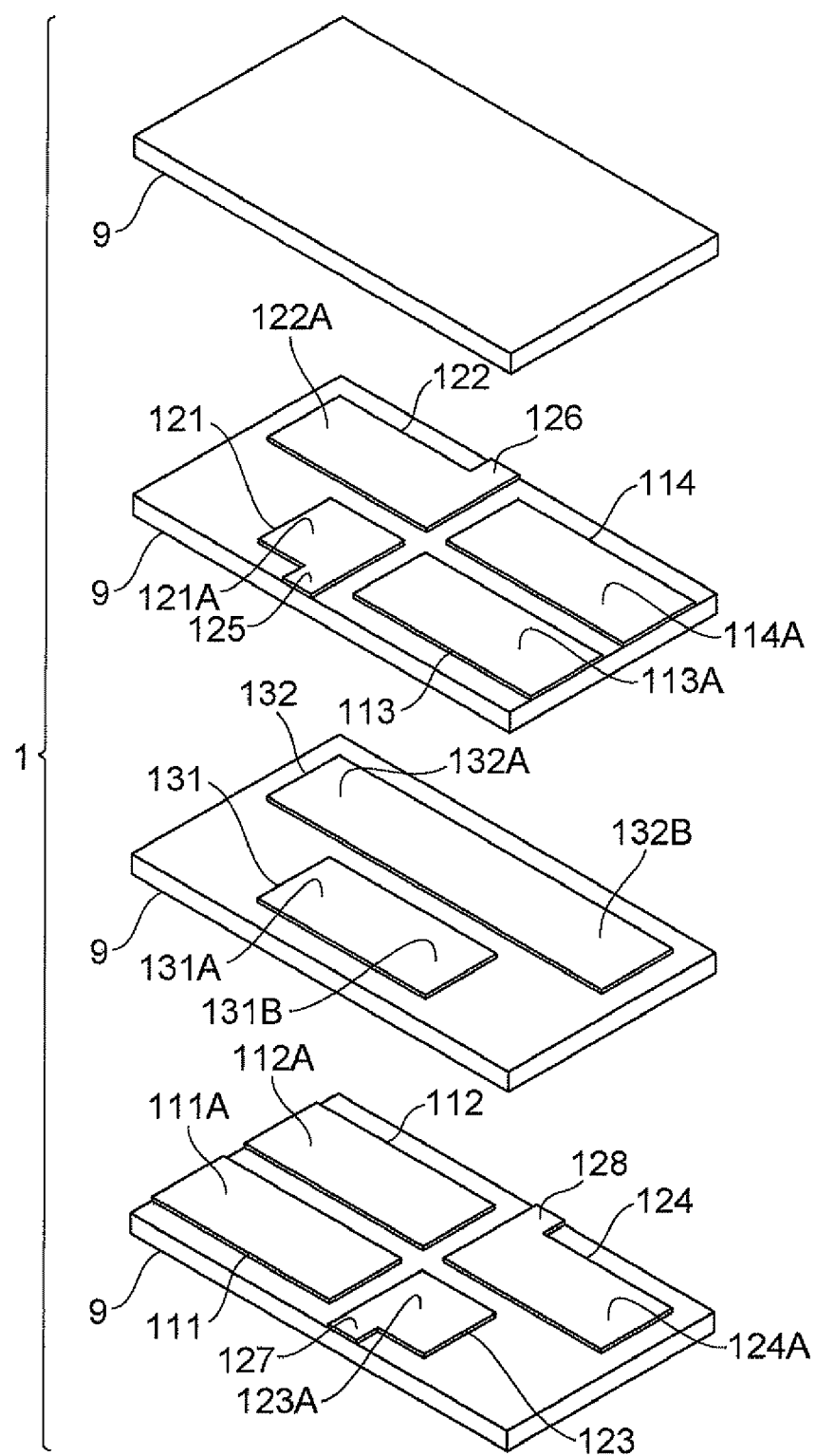
FIG. 10 is an exploded perspective view of a capacitor element body included in the multilayer capacitor in accordance with a fourth embodiment.

The structure of a multilayer capacitor C4 in accordance with the fourth embodiment will be explained with reference to FIGS. 10 to 12. FIG. 10 is an exploded perspective view of a capacitor element body included in the multilayer capacitor in accordance with this embodiment. FIG. 11 is a view illustrating a cross-sectional structure of the multilayer capacitor in accordance with this embodiment. FIG. 12 is an equivalent circuit diagram of the multilayer capacitor in accordance with this embodiment.

Figure 11A:
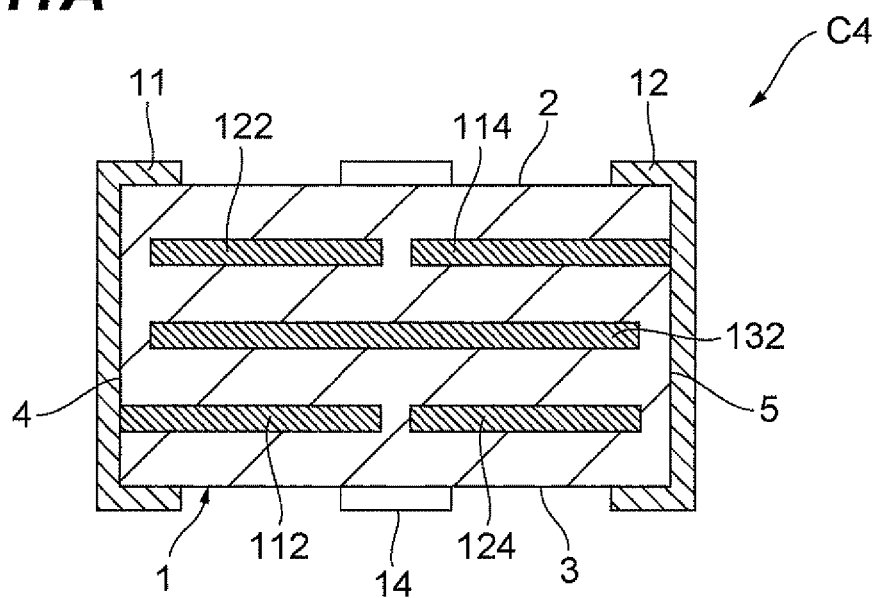
FIGS. 11A and 11B are views illustrating a cross-sectional structure of the multilayer capacitor in accordance with the fourth embodiment.
Figure 11B:
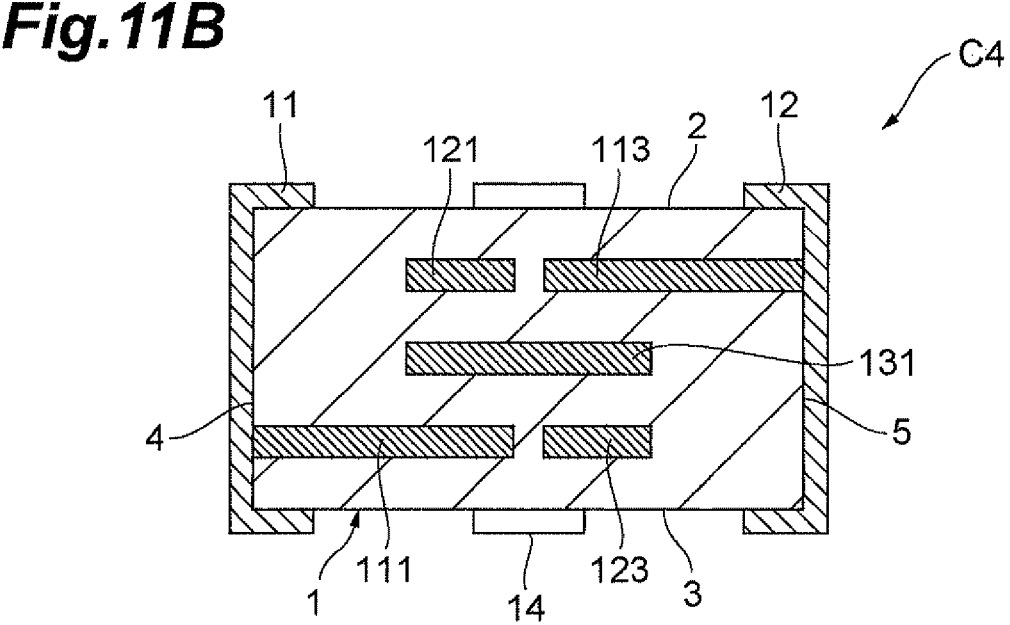
Figure 12:
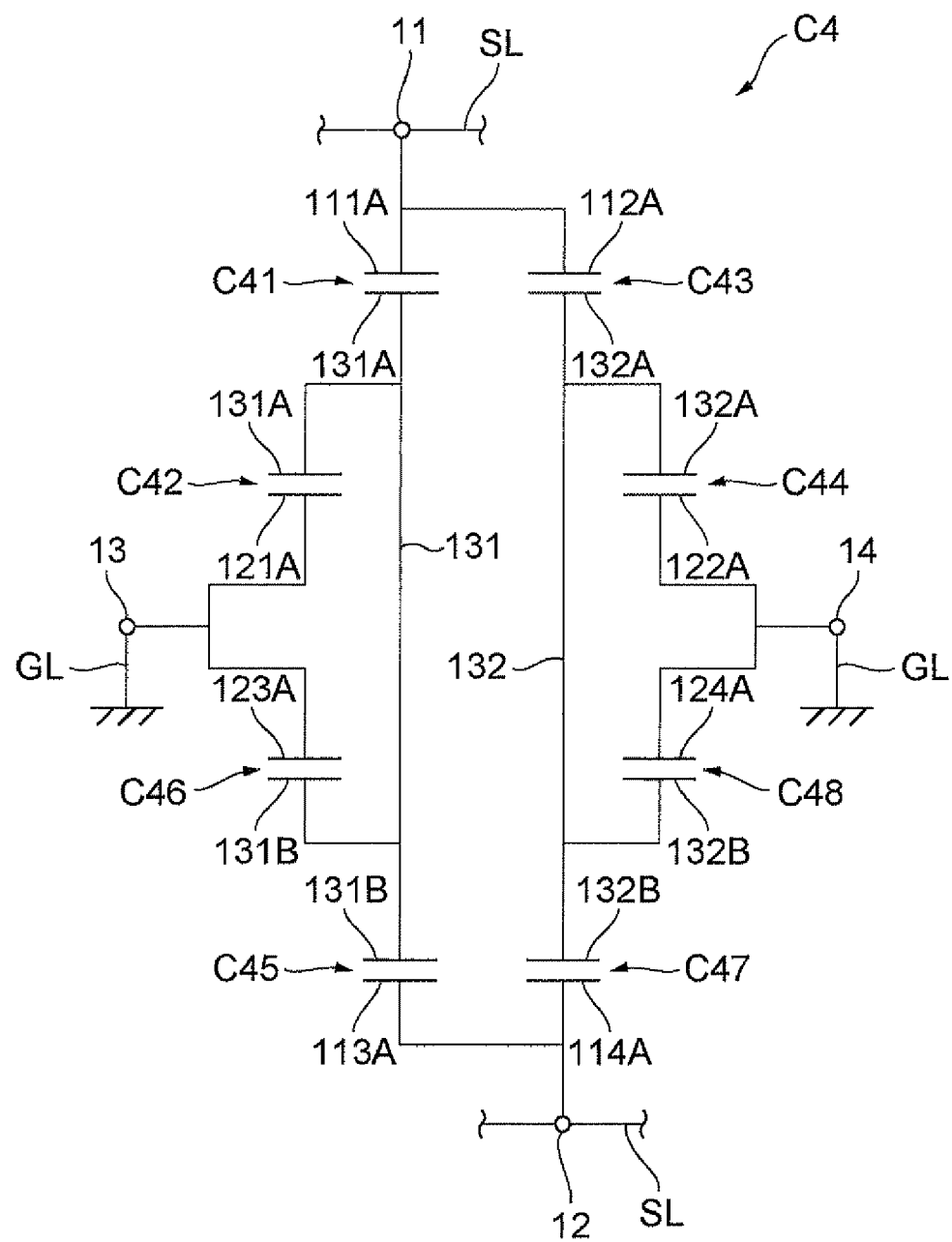
FIG. 12 is an equivalent circuit diagram of the multilayer capacitor in accordance with the fourth embodiment.

As illustrated in FIGS. 10 and 11, the multilayer capacitor C4 in accordance with this embodiment comprises signal internal electrodes 111 to 114 which are arranged as with the signal internal electrodes 61 to 64 in accordance with the second embodiments, respectively, in terms of their forms and positions. The multilayer capacitor C4 comprises grounding internal electrodes 121 to 124 instead of the grounding internal electrodes 71 to 74 in accordance with the second embodiment. The multilayer capacitor C4 comprises intermediate internal electrodes 131, 132 instead of the intermediate internal electrodes 101, 102 in accordance with the third embodiment. FIGS. 11A and 11B illustrate respective cross-sectional structures of the capacitor element body 1 cut along planes parallel to the third and fourth side faces 6, 7. FIG. 11A illustrates the structure in the case where the capacitor element body 1 is cut such that the cross section includes the internal electrodes 114, 122, while FIG. 11B illustrates the structure in the case where the capacitor element body 1 is cut such that the cross section includes the internal electrodes 113, 121.

The grounding internal electrode 121 is formed as if the grounding internal electrode 71 of the second embodiment were made shorter on the first side face 4 side. The grounding internal electrode 123 is formed as if the grounding internal electrode 73 of the second embodiment were made shorter on the second side face 5 side. As with the grounding internal electrodes 71, 73 of the second embodiment, the grounding internal electrodes 121, 123 have respective lead portions 125, 127 and are connected physically and electrically to the first ground terminal electrode 13.

The grounding internal electrodes 122, 124 are arranged as with the grounding internal electrodes 72, 74 of the second embodiment, respectively, in terms of their forms and positions. The grounding internal electrodes 122, 124 have respective lead portions 126, 128 and are connected physically and electrically to the second ground terminal electrode 14.

The signal internal electrode 111 and the grounding internal electrode 121 are arranged such as to overlap as seen in the laminating direction. A region 111A in the signal internal electrode 111 and a region 121A in the grounding internal electrode 121 are regions overlapping each other as seen in the laminating direction. The signal internal electrode 112 and the grounding internal electrode 122 are arranged such as to overlap as seen in the laminating direction. A region 112A in the signal internal electrode 112 and a region 122A in the grounding internal electrode 122 are regions overlapping each other as seen in the laminating direction.

The signal internal electrode 113 and the grounding internal electrode 123 are arranged such as to overlap as seen in the laminating direction. A region 113A in the signal internal electrode 113 and a region 123A in the grounding internal electrode 123 are regions overlapping each other as seen in the laminating direction. The signal internal electrode 114 and the grounding internal electrode 124 are arranged such as to overlap as seen in the laminating direction. A region 114A in the signal internal electrode 114 and a region 124A in the grounding internal electrode 124 are regions overlapping each other as seen in the laminating direction.

The intermediate internal electrode 131, which is formed as if the intermediate internal electrode 101 of the third embodiment were made shorter in the opposing direction of the first and second side faces 4, 5, is arranged at a center portion in the opposing direction of the first and second side faces 4, 5. One side of the intermediate internal electrode 131 facing the first side face 4 overlaps one side of the grounding internal electrode 121 facing the first side face 4 as seen in the laminating direction. One side of the intermediate internal electrode 131 facing the second side face 5 overlaps one side of the grounding internal electrode 123 facing the second side face 5 as seen in the laminating direction.

The intermediate internal electrode 132 is arranged as with the intermediate internal electrode 102 of the third embodiment in terms of the form and position.

The intermediate internal electrode 131 has a region 131A overlapping the region 111A of the signal internal electrode 111 and the region 121A of the grounding internal electrode 121 as seen in the laminating direction. Therefore, the region 131A of the intermediate internal electrode 131 and the region 111A of the signal internal electrode 111 oppose each other through the dielectric layer 9 in the laminating direction, thereby constructing a first capacitor C41. The region 131A of the intermediate internal electrode 131 and the region 121A of the grounding internal electrode 121 oppose each other through the dielectric layer 9 in the laminating direction, thereby constructing a second capacitor C42.

The intermediate internal electrode 132 has a region 132A overlapping the region 112A of the signal internal electrode 112 and the region 122A of the grounding internal electrode 122 as seen in the laminating direction. Therefore, the region 132A of the intermediate internal electrode 132 and the region 112A of the signal internal electrode 112 oppose each other through the dielectric layer 9 in the laminating direction, thereby constructing a third capacitor C43. The region 132A of the intermediate internal electrode 132 and the region 122A of the grounding internal electrode 122 oppose each other through the dielectric layer 9 in the laminating direction, thereby constructing a fourth capacitor C44.

The intermediate internal electrode 131 has a region 131B overlapping the region 113A of the signal internal electrode 113 and the region 123A of the grounding internal electrode 123 as seen in the laminating direction. Therefore, the region 131B of the intermediate internal electrode 131 and the region 113A of the signal internal electrode 113 oppose each other through the dielectric layer 9 in the laminating direction, thereby constructing a fifth capacitor C45. The region 131B of the intermediate internal electrode 131 and the region 123A of the grounding internal electrode 123 oppose each other through the dielectric layer 9 in the laminating direction, thereby constructing a sixth capacitor C46.

The intermediate internal electrode 132 has a region 132B overlapping the region 114A of the signal internal electrode 114 and the region 124A of the grounding internal electrode 124 as seen in the laminating direction. Therefore, the region 132B of the intermediate internal electrode 132 and the region 114A of the signal internal electrode 114 oppose each other through the dielectric layer 9 in the laminating direction, thereby constructing a seventh capacitor C47. The region 132B of the intermediate internal electrode 132 and the region 124A of the grounding internal electrode 124 oppose each other through the dielectric layer 9 in the laminating direction, thereby constructing an eighth capacitor C48.

In the multilayer capacitor C4, each of the areas by which the constituent electrode layers of the first, second, fifth, and sixth capacitors C41, C42, C45, C46 oppose each other is smaller than any of the areas by which the constituent electrode layers of the third, fourth, seventh, and eighth capacitors C43, C44, C47, C48 oppose each other. Hence, each of the first, second, fifth, and sixth capacitors C41, C42, C45, C46 has a capacitance smaller than that of any of the third, fourth, seventh, and eighth capacitors C43, C44, C47, C48.

In thus constructed multilayer capacitor C4, the first signal terminal electrode 11 and second signal terminal electrode 12 are insulated from each other, while the first and second signal terminal electrodes 11, 12 are insulated from the first and second ground terminal electrodes 13, 14.

In the multilayer capacitor C4, as illustrated in FIG. 12, two capacitors, i.e., the first and second capacitors C41, C42, are connected in series between the first signal terminal electrode 11 and the first ground terminal electrode 13. Two capacitors, i.e., the third and fourth capacitors C43, C44, are connected in series between the first signal terminal electrode 11 and the second ground terminal electrode 14. Two capacitors, i.e., the fifth and sixth capacitors C45, C46, are connected in series between the second signal terminal electrode 12 and the first ground terminal electrode 13. Two capacitors, i.e., the seventh and eighth capacitors C47, C48, are connected in series between the second signal terminal electrode 12 and the second ground terminal electrode 14. As a consequence, the voltage resistance between the terminals can be improved. Even when one of the two capacitors is broken and short-circuited, the other capacitor exists between the terminals, whereby the insulation between the terminals can be kept.

In this embodiment, the intermediate internal electrode 131 has no region overlapping any of the signal internal electrodes 112, 114 and grounding internal electrodes 122, 124 in the laminating direction. The intermediate internal electrode 132 has no region overlapping any of the signal internal electrodes 111, 113 and grounding internal electrodes 121, 123 in the laminating direction. Therefore, crosstalk can be inhibited from occurring between the set of the first, second, fifth, and sixth capacitors C41, C42, C45, C46 constructed by the intermediate internal electrode 131, signal internal electrodes 111, 113, and grounding internal electrodes 121, 123 and the set of the third, fourth, seventh, and eighth capacitors C43, C44, C47, C48 constructed by the intermediate internal electrode 132, signal internal electrodes 112, 114, and grounding internal electrodes 122, 124.

As illustrated in FIG. 12, a set of the first and second capacitors C41, C42 and a set of the third and fourth capacitors C43, C44 are connected in parallel between the first signal terminal electrode 11 and the first and second ground terminal electrodes 13, 14. The set of the first and second capacitors C41, C42 has a capacitance smaller than that of the set of the third and fourth capacitors C43, C44. Therefore, the sets of capacitors connected in parallel between the first signal terminal electrode 11 and the first and second ground terminal electrodes 13, 14 exhibit respective capacitances different from each other. This can widen the bandwidth yielding low impedance.

A set of the fifth and sixth capacitors C45, C46 and a set of the seventh and eighth capacitors C47, C48 are connected in parallel between the second signal terminal electrode 12 and the first and second ground terminal electrodes 13, 14. The set of the fifth and sixth capacitors C45, C46 has a capacitance smaller than that of the set of the seventh and eighth capacitors C47, C48. Therefore, the sets of capacitors connected in parallel between the second signal terminal electrode 12 and the first and second ground terminal electrodes 13, 14 exhibit respective capacitances different from each other. This can widen the bandwidth yielding low impedance.

In this embodiment, the grounding internal electrode 121 is formed by an area smaller than that of the grounding internal electrode 122, while the intermediate internal electrode 131 is formed by an area smaller than that of the intermediate internal electrode 132. This can easily make the capacitance of the capacitor formed by the grounding internal electrode 121 and intermediate internal electrode 131 and the capacitance of the capacitor formed by the grounding internal electrode 122 and intermediate internal electrode 132 differ from each other. Hence, the capacitance of the set of the first and second capacitors C41, C42 can easily be made different from that of the set of the third and fourth capacitors C43, C44.

In this embodiment, the grounding internal electrode 123 is formed by an area smaller than that of the grounding internal electrode 124, while the intermediate internal electrode 131 is formed by an area smaller than that of the intermediate internal electrode 132. This can easily make the capacitance of the capacitor formed by the grounding internal electrode 123 and intermediate internal electrode 131 and the capacitance of the capacitor formed by the grounding internal electrode 124 and intermediate internal electrode 132 differ from each other. Hence, the capacitance of the set of the fifth and sixth capacitors C45, C46 can easily be made different from that of the set of the seventh and eighth capacitors C47, C48.

Though preferred embodiments of the present invention are explained in the foregoing, the present invention is not necessarily limited to the above-mentioned embodiments but can be modified in various ways within the scope not deviating from the gist thereof. For example, the multilayer capacitor C1 may be free of the second ground terminal electrode 14 in the first embodiment. In the first to fourth embodiments, the layers on which the signal internal electrodes and grounding internal electrodes are arranged are not restricted to those mentioned above.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a capacitor element body constituted by a plurality of laminated dielectric layers;
   first and second signal terminal electrodes and a ground terminal electrode each arranged on an outer surface of the capacitor element body; and
   a ground electrode, first and second signal electrodes, and an intermediate internal electrode each arranged within the capacitor element body;
   wherein the first signal electrode is connected to the first signal terminal electrode;
   wherein the second signal electrode is connected to the second signal terminal electrode;
   wherein the ground electrode is connected to the ground terminal electrode and has a first region overlapping the first signal electrode in a first direction in which the plurality of dielectric layers are laminated and a second region overlapping the second signal electrode in the first direction;
   wherein the intermediate internal electrode is arranged such as to be separated from the first and second signal terminal electrodes and the ground terminal electrode and positioned between the first signal electrode and the ground electrode and between the second signal electrode and the ground electrode; and
   wherein the intermediate internal electrode has a region overlapping the first region in the first direction and a region overlapping the second region in the first direction.

2. A multilayer capacitor according to claim 1, wherein the ground electrode has a first ground electrode including the first region and a second ground electrode including the second region; and
   wherein the first and second ground electrodes are arranged separately from each other.

3. A multilayer capacitor according to claim 2, wherein the first and second signal electrodes are arranged on respective layers different from each other.

4. A multilayer capacitor according to claim 3, wherein the ground terminal electrode includes first and second terminal electrodes;
- wherein the first signal electrode has first and second electrode parts, the first and second electrode parts being arranged separately from each other and commonly connected to the first signal terminal electrode;
- wherein the second signal electrode has third and fourth electrode parts, the third and fourth electrode parts being arranged separately from each other and commonly connected to the second signal terminal electrode;
- wherein the first ground electrode has a fifth electrode part including a third region overlapping the first electrode part in the first direction and a sixth electrode part including a fourth region overlapping the second electrode part in the first direction, the fifth and sixth electrode parts being arranged separately from each other, the fifth electrode part being connected to the first ground terminal electrode, the sixth electrode part being connected to the second ground terminal electrode;
- wherein the second ground electrode has a seventh electrode part including a fifth region overlapping the third electrode part in the first direction and an eighth electrode part including a sixth region overlapping the fourth electrode part in the first direction, the seventh and eighth electrode parts being arranged separately from each other, the seventh electrode part being connected to the first ground terminal electrode, the eighth electrode part being connected to the second ground terminal electrode;
- wherein the intermediate internal electrode is arranged between the first and fifth electrode parts, between the second and sixth electrode parts, between the third and seventh electrode parts, and between the fourth and eighth electrode parts; and
- wherein the intermediate internal electrode has a region overlapping the third to sixth regions in the first direction.

5. A multilayer capacitor according to claim 4, wherein the intermediate internal electrode has a ninth electrode part including a region overlapping the third and fifth regions in the first direction and a tenth electrode part including a region overlapping the fourth and sixth regions in the first direction, the ninth and tenth electrode parts being arranged separately from each other.

6. A multilayer capacitor according to claim 4, wherein a capacitor formed by the first electrode part, intermediate internal electrode, and fifth electrode part has a capacitance different from that of a capacitor formed by the second electrode part, intermediate internal electrode, and sixth electrode part.

7. A multilayer capacitor according to claim 6, wherein the first and second electrode parts have respective areas different from each other.

8. A multilayer capacitor according to claim 6, wherein the fifth and sixth electrode parts have respective areas different from each other.

9. A multilayer capacitor according to claim 6, wherein the intermediate internal electrode has a ninth electrode part including a region overlapping the third and fifth regions in the first direction and a tenth electrode part including a region overlapping the fourth and sixth regions in the first direction, the ninth and tenth electrode parts being arranged separately from each other; and
- wherein the ninth and tenth electrode parts have respective areas different from each other.

10. A multilayer capacitor according to claim 4, wherein the capacitor element body is formed like a substantially rectangular parallelepiped and has first and second side faces opposing each other and extending transversely of the capacitor element body and third and fourth side faces opposing each other and extending longitudinally of the capacitor element body;
- wherein the first signal terminal electrode is arranged on the first side face;
- wherein the second signal terminal electrode is arranged on the second side face;
- wherein the first ground terminal electrode is arranged on the third side face; and
- wherein the second ground terminal electrode is arranged on the fourth side face.

11. A multilayer capacitor according to claim 2, wherein the first and second ground electrodes are arranged on respective layers different from each other.

12. A multilayer capacitor according to claim 11, wherein the first signal electrode and the second ground electrode are arranged on the same layer; and
- wherein the second signal electrode and the first ground electrode are arranged on the same layer.

* * * * *